(12) United States Patent
Erickson et al.

(10) Patent No.: US 9,338,071 B2
(45) Date of Patent: May 10, 2016

(54) LOCALE PROFILE FOR A FABRIC NETWORK

(71) Applicant: Google Inc., Mountain View, CA (US)

(72) Inventors: Grant M. Erickson, Sunnyvale, CA (US); Jay D. Logue, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/588,081

(22) Filed: Dec. 31, 2014

(65) Prior Publication Data

US 2016/0105339 A1    Apr. 14, 2016

Related U.S. Application Data

(60) Provisional application No. 62/061,593, filed on Oct. 8, 2014.

(51) Int. Cl.
*H04L 12/26* (2006.01)
*H04L 12/28* (2006.01)
*H04L 29/08* (2006.01)

(52) U.S. Cl.
CPC .......... *H04L 43/0805* (2013.01); *H04L 12/281* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 7,103,875 B1* | 9/2006 | Kaneko | ............. | G06F 9/4448 717/106 |
| 7,161,483 B2* | 1/2007 | Chung | ............. | 340/531 |
| 7,571,092 B1* | 8/2009 | Nieh | ............. | G06F 9/4448 704/1 |
| 7,636,656 B1* | 12/2009 | Nieh | ............. | G06F 17/289 704/1 |
| 8,279,874 B1* | 10/2012 | Lu | ............. | H04L 41/0806 370/395.2 |
| 8,560,645 B2* | 10/2013 | Linden | ............. | H04L 41/0806 370/310.2 |
| 9,000,896 B1* | 4/2015 | Kim | ............. | H04L 47/41 340/10.3 |
| 9,054,961 B1* | 6/2015 | Kim | ............. | H04L 41/0806 |
| 9,141,370 B1* | 9/2015 | Nay | ............. | G06F 8/65 |
| 2004/0049590 A1 | 3/2004 | Collier et al. | | |
| 2004/0102931 A1* | 5/2004 | Ellis | ............. | A61B 5/1038 702/188 |
| 2004/0114601 A1* | 6/2004 | Watanabe | ............. | H04L 67/303 370/395.2 |
| 2004/0236874 A1* | 11/2004 | Largman | ............. | G06F 21/53 710/8 |
| 2005/0091346 A1* | 4/2005 | Krishnaswami | ............. | G06F 9/44505 709/220 |
| 2005/0132055 A1* | 6/2005 | Neogi | ............. | H04L 63/08 709/227 |
| 2005/0138648 A1* | 6/2005 | Ahmed et al. | ............. | 719/328 |
| 2005/0199716 A1* | 9/2005 | Shafer et al. | ............. | 235/385 |
| 2005/0260989 A1 | 11/2005 | Pourtier et al. | | |

(Continued)

OTHER PUBLICATIONS

Phillips et al., Internet Engineering Task Force. Tags for Identifying Languages. BCP 47. Sep. 2009. http://tools.ietf.org/html/bcp47.

(Continued)

*Primary Examiner* — Greg C Bengzon

(57) ABSTRACT

Methods and systems for conveying locale information for an electronic device includes receiving, from a remote device and via a network interface of at least one network interfaces, a request for active or available locales for the electronic device. Conveying the locale information also includes sending, to the remote device and via the network interface, a message in a locale profile format including a list of available locales. The message includes a version field that indicates a version of schema used to transmit the list of available locales, an active local field that indicates a locale currently being used by the electronic device, and an available locales field that indicates which locales are available for use by the electronic device.

52 Claims, 20 Drawing Sheets

(56) References Cited

U.S. PATENT DOCUMENTS

| | | | |
|---|---|---|---|
| 2006/0026304 A1* | 2/2006 | Price | 710/8 |
| 2006/0053234 A1* | 3/2006 | Kumar et al. | 710/11 |
| 2006/0092890 A1 | 5/2006 | Gupta et al. | |
| 2006/0200766 A1* | 9/2006 | Lakritz | 715/536 |
| 2006/0259160 A1* | 11/2006 | Hood | G05B 19/4188 700/20 |
| 2006/0282498 A1* | 12/2006 | Muro | 709/203 |
| 2007/0011673 A1* | 1/2007 | Melo et al. | 717/174 |
| 2007/0055758 A1* | 3/2007 | McCoy et al. | 709/223 |
| 2007/0061018 A1 | 3/2007 | Callaghan et al. | |
| 2007/0218875 A1 | 9/2007 | Calhoun et al. | |
| 2007/0240154 A1* | 10/2007 | Gerzymisch et al. | 717/174 |
| 2007/0282944 A1* | 12/2007 | Odaka et al. | 709/203 |
| 2008/0001713 A1* | 1/2008 | Dasgupta et al. | 340/10.1 |
| 2008/0005287 A1* | 1/2008 | Harvey et al. | 709/220 |
| 2008/0092057 A1* | 4/2008 | Monson | G06F 9/4443 715/744 |
| 2008/0103610 A1* | 5/2008 | Ebrom et al. | 700/29 |
| 2008/0184151 A1* | 7/2008 | Agarwal et al. | 715/772 |
| 2008/0188963 A1* | 8/2008 | McCoy | 700/90 |
| 2008/0189637 A1* | 8/2008 | Krajewski | G06F 9/4443 715/771 |
| 2008/0281472 A1* | 11/2008 | Podgorny et al. | 700/276 |
| 2008/0301669 A1* | 12/2008 | Rao | G06F 8/65 717/173 |
| 2008/0301672 A1* | 12/2008 | Rao | G06F 8/61 717/177 |
| 2008/0305806 A1* | 12/2008 | Jung | H04L 29/12783 455/456.1 |
| 2009/0058618 A1* | 3/2009 | Gopalan et al. | 340/10.51 |
| 2009/0063659 A1* | 3/2009 | Kazerouni | G06F 3/14 709/219 |
| 2009/0132070 A1* | 5/2009 | Ebrom et al. | 700/90 |
| 2009/0177462 A1* | 7/2009 | Alfven | 704/3 |
| 2009/0210803 A1* | 8/2009 | Brignull et al. | 715/757 |
| 2010/0011354 A1* | 1/2010 | Gharabally et al. | 717/178 |
| 2010/0030549 A1* | 2/2010 | Lee | G06F 1/1626 704/4 |
| 2010/0106330 A1* | 4/2010 | Grohman | 700/277 |
| 2010/0325313 A1* | 12/2010 | Esteve Asensio | G06F 9/4451 709/246 |
| 2011/0093535 A1* | 4/2011 | Takakura | G06Q 10/06 709/203 |
| 2011/0099547 A1* | 4/2011 | Banga | G06F 8/61 717/716 |
| 2012/0016659 A1* | 1/2012 | Miura et al. | 704/8 |
| 2012/0082091 A1* | 4/2012 | Siomina | H04W 4/02 370/328 |
| 2012/0094643 A1* | 4/2012 | Brisebois et al. | 455/418 |
| 2012/0115453 A1* | 5/2012 | Zheng | H04M 1/72569 455/418 |
| 2012/0117497 A1* | 5/2012 | Uola | G06F 9/4443 715/762 |
| 2012/0144058 A1* | 6/2012 | Ohashi et al. | 709/232 |
| 2012/0195235 A1* | 8/2012 | Balla et al. | 370/259 |
| 2012/0246345 A1 | 9/2012 | Contreras et al. | |
| 2012/0271619 A1* | 10/2012 | Abdel-Kader | 704/3 |
| 2012/0331182 A1* | 12/2012 | Bishop | 710/8 |
| 2013/0124186 A1* | 5/2013 | Donabedian | G06F 17/289 704/2 |
| 2013/0136117 A1 | 5/2013 | Schrum et al. | |
| 2013/0151563 A1* | 6/2013 | Addepalli | H04L 67/10 707/792 |
| 2013/0159476 A1* | 6/2013 | Hilburn | H04L 67/303 709/220 |
| 2013/0322281 A1 | 12/2013 | Ludlow et al. | |
| 2013/0346064 A1* | 12/2013 | Chen et al. | 704/8 |
| 2014/0016513 A1* | 1/2014 | Garcia Martin et al. | 370/259 |
| 2014/0108018 A1* | 4/2014 | Phillips et al. | 704/275 |
| 2014/0122055 A1* | 5/2014 | Hobson | 704/8 |
| 2014/0123123 A1* | 5/2014 | Bahls | 717/170 |
| 2014/0129209 A1* | 5/2014 | Saleme et al. | 704/8 |
| 2014/0163948 A1* | 6/2014 | Daly | G06F 17/289 704/2 |
| 2014/0169214 A1 | 6/2014 | Nakajima | |
| 2014/0180671 A1* | 6/2014 | Osipova | 704/8 |
| 2014/0187224 A1* | 7/2014 | Liu | H04W 24/02 455/418 |
| 2014/0278343 A1* | 9/2014 | Tran | G06F 17/2785 704/2 |
| 2014/0280520 A1 | 9/2014 | Baier et al. | |
| 2014/0303961 A1* | 10/2014 | Leydon et al. | 704/2 |
| 2014/0358516 A1* | 12/2014 | Lin et al. | 704/2 |
| 2014/0359101 A1 | 12/2014 | Dawes et al. | |
| 2014/0359601 A1* | 12/2014 | Constable et al. | 717/175 |
| 2014/0366011 A1* | 12/2014 | Rector | G06F 8/71 717/170 |
| 2014/0376405 A1* | 12/2014 | Erickson et al. | 370/254 |
| 2015/0006633 A1 | 1/2015 | Vandwalle et al. | |
| 2015/0006696 A1* | 1/2015 | Hershberg | H04L 67/12 709/223 |
| 2015/0023336 A1 | 1/2015 | Ilsar et al. | |
| 2015/0074259 A1* | 3/2015 | Ansari et al. | 709/224 |
| 2015/0089375 A1* | 3/2015 | Liu et al. | 715/736 |
| 2015/0128126 A1* | 5/2015 | Brunet | G06F 8/65 717/172 |
| 2015/0161114 A1* | 6/2015 | Buryak et al. | |
| 2015/0334161 A1* | 11/2015 | Bullotta | G06F 9/4443 709/201 |
| 2015/0347114 A1* | 12/2015 | Yoon | G06F 8/61 235/375 |
| 2015/0365480 A1* | 12/2015 | Soto | H04L 67/125 709/224 |

OTHER PUBLICATIONS

J. Klensin, Internationalized Domain Names in Applications (IDNA): Protocol, Aug. 2010. http://tools.ietf.org/html/rfc5891.

USB Implementers' Forum. Universal Serial Bus (USB): Device Class Definition for Human Interface Devices (HID). Version 1.11. Jun. 27, 2001; http://www.usb.org/developers/hidpage/HID1_11.pdf.

Language Tags in HTML and XML, Sep. 10, 2009, http://www.w3.org/International/articles/language-tags/Overview.en.php.

Ping, Oracle Manual Pages Section 1M: System Administration Commands, pp. 1706-1710, 2013 http://www.w3.org/International/articles/language-tags/Overview.en.php.

Markus Mathes; "Time Constrained Web Services for Industrial Automation," Dissertation from Philipps Universitat—Marburg; pp. 1-201, Jul. 9, 2009.

International Search Report and Written Opinion for PCT Application No. PCT/US2015/054287 dated Jan. 22, 2016; 14 pgs.

* cited by examiner

LOCALE PROFILE FOR A FABRIC NETWORK

CROSS-REFERENCE TO RELATED APPLICATIONS

This application claims the benefit of Provisional Application Ser. No. 62/061,593, filed Oct. 8, 2014, entitled "FABRIC NETWORK," which is incorporated by reference herein in its entirety.

BACKGROUND

This disclosure relates data communication profiles for systems, devices, methods, and related computer program products for smart buildings, such as a smart home. This disclosure relates to a fabric network that couples electronic devices using one or more network types and a locale profile used to identify and/or provide information about the electronic devices.

Some homes today are equipped with smart home networks to provide automated control of devices, appliances and systems, such as heating, ventilation, and air conditioning ("HVAC") systems, lighting systems, alarm systems, and home theater and entertainment systems. Smart home networks may include control panels that a person may use to input settings, preferences, and scheduling information that the smart home network uses to provide automated control the various devices, appliances and systems in the home. For example, a person may input a desired temperature and a schedule indicating when the person is away from home. However, these networks may include various devices that may have different languages and/or locations that cause communications between the devices and/or users to be less effective than desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems and methods a fabric network that includes one or more logical networks that enables devices connected to the fabric to communicate with each other using a list of protocols and/or profiles known to the devices. The communications between the devices may follow a typical message format that enables the devices to understand communications between the devices regardless of which logical networks the communicating devices are connected to in the fabric. Within the message format, a payload of data may be included for the receiving device to store and/or process. The format and the contents of the payload may vary according to a header (e.g., profile tag) within the payload that indicates a specific profile (including one or more protocols) and/or a type of message that is being sent according to the profile.

According to some embodiments, two or more devices in a fabric may communicate using various profiles. For example, in certain embodiments, a locale profile, a network provisioning profile, or a core profile (including status reporting protocols) that are available to devices connected to the fabric. For example, using a locale profile, devices may send or request information to or from other devices in the fabric in an understood message format to cause the devices to indicate a location and/or language that is currently being used and/or that is available. Furthermore, a device may change the location and/or language being used by another device that is remote from the device being changed.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
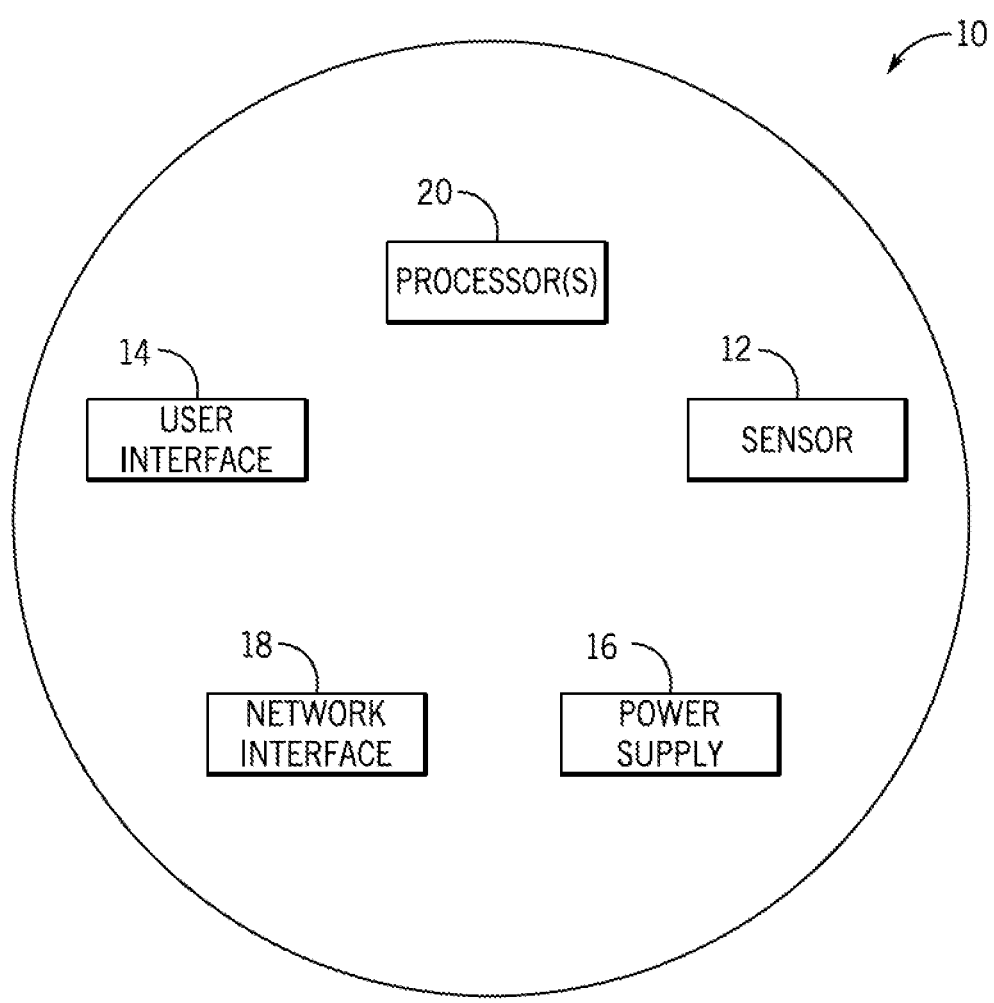
FIG. 1 is a block diagram of an electronic device having that may be interconnected with other devices using a fabric network, in accordance with an embodiment.

One or more specific embodiments of the present disclosure will be described below. These described embodiments are only examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate generally to an efficient fabric network that may be used by devices and/or services communicating with each other in a home environment. Generally, consumers living in homes may find it useful to coordinate the operations of various devices within their home such that of their devices are operated efficiently. For example, a thermostat device may be used to detect a temperature of a home and coordinate the activity of other devices (e.g., lights) based on the detected temperature. In this example, the thermostat device may detect a temperature that may indicate that the temperature outside the home corresponds to daylight hours. The thermostat device may then convey to the light device that there may be daylight available to the home and that thus the light should turn off.

In addition to operating these devices efficiently, consumers generally prefer to use user-friendly devices that involve a minimum amount of set up or initialization. That is, consumers may generally prefer to purchase devices that are fully operational after performing a few number initialization steps that may be performed by almost any individual regardless of age or technical expertise.

With the foregoing in mind, to enable to effectively communicate data between each other within the home environment, the devices may use a fabric network that includes one or more logical networks to manage communication between the devices. That is, the efficient fabric network may enable numerous devices within a home to communicate with each other using one or more logical networks. The communication network may support Internet Protocol version 6 (IPv6)

communications such that each connected device may have a unique local address (LA). Moreover, to enable each device to integrate with a home, it may be useful for each device to communicate within the network using low amounts of power. That is, by enabling devices to communicate using low power, the devices may be placed anywhere in a home without being coupled to a continuous power source (e.g., battery-powered).

I. Fabric Introduction

By way of introduction, FIG. 1 illustrates an example of a general device 10 that may that may communicate with other like devices within a home environment. In one embodiment, the device 10 may include one or more sensors 12, a user-interface component 14, a power supply 16 (e.g., including a power connection and/or battery), a network interface 18, a processor 20, and the like. Particular sensors 12, user-interface components 14, and power-supply configurations may be the same or similar with each devices 10. However, it should be noted that in some embodiments, each device 10 may include particular sensors 12, user-interface components 14, power-supply configurations, and the like based on a device type or model.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with a single sensor, many embodiments may include multiple sensors. In some instances, the device 10 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more user-interface components 14 in the device 10 may receive input from the user and/or present information to the user. The user-interface component 14 may also include one or more user-input components that may receive information from the user. The received input may be used to determine a setting. In certain embodiments, the user-input components may include a mechanical or virtual component that responds to the user's motion. For example, the user can mechanically move a sliding component (e.g., along a vertical or horizontal track) or rotate a rotatable ring (e.g., along a circular track), the user's motion along a touchpad may be detected, or motions/gestures may be detected using a contactless gesture detection sensor (e.g., infrared sensor or camera). Such motions may correspond to a setting adjustment, which can be determined based on an absolute position of a user-interface component 104 or based on a displacement of a user-interface components 104 (e.g., adjusting a setpoint temperature by 1 degree F. for every 10° rotation of a rotatable-ring component). Physically and virtually movable user-input components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-input component may be associated with a magnitude of a setting adjustment, such that a user may dramatically alter a setting with a large movement or finely tune a setting with s small movement.

The user-interface components 14 may also include one or more buttons (e.g., up and down buttons), a keypad, a number pad, a switch, a microphone, and/or a camera (e.g., to detect gestures). In one embodiment, the user-input component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-input component 14 may include a camera that may detect gestures (e.g., to indicate that a power or alarm state of a device is to be changed). In some instances, the device 10 may have one primary input component, which may be used to set various types of settings. The user-interface components 14 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available. In certain embodiments, the power supply component 16 may include intermittent or reduced power connections that may be less than that provided via an AC plug in the home. In certain embodiments, devices with batteries and/or intermittent or reduced power may be operated as "sleepy devices" that alternate between an online/awake state and an offline/sleep state to reduce power consumption.

The network interface 18 may include one or more components that enable the device 10 to communicate between devices using one or more logical networks within the fabric network. In one embodiment, the network interface 18 may communicate using an efficient network layer as part of its Open Systems Interconnection (OSI) model. In certain embodiments, one component of the network interface 18 may communicate with one logical network (e.g., WiFi) and another component of the network interface may communicate with another logical network (e.g., 802.15.4). In other words, the network interface 18 may enable the device 10 to wirelessly communicate via multiple IPv6 networks. As such, the network interface 18 may include a wireless card, Ethernet port, and/or other suitable transceiver connections.

The processor 20 may support one or more of a variety of different device functionalities. As such, the processor 20 may include one or more processors configured and programmed to carry out and/or cause to be carried out one or more of the functionalities described herein. In one embodiment, the processor 20 may include general-purpose processors carrying out computer code stored in local memory (e.g., flash memory, hard drive, random access memory), special-purpose processors or application-specific integrated circuits, other types of hardware/firmware/software processing platforms, and/or some combination thereof. Further, the processor 20 may be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, the processor 20 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 20 may include image recognition technology to identify particular occupants or objects.

In some instances, the processor 20 may predict desirable settings and/or implement those settings. For example, based on presence detection, the processor 20 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 20 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influences actions of a second device using one or more common profiles between the devices. For example, a first device can detect that a user has pulled into a garage (e.g., by detecting motion in the garage, detecting a change in light in the garage or detecting opening of the garage door). The first device can transmit this information to a second device via the fabric network, such that the second device can, e.g., adjust a home temperature setting, a light setting, a music setting, and/or a security-alarm setting. As another example, a first device can detect a user approaching a front door (e.g., by detecting motion or sudden light pattern changes). The first device may cause a general audio or visual signal to be presented (e.g., such as sounding of a doorbell) or cause a location-specific audio or visual signal to be presented (e.g., to announce the visitor's presence within a room that a user is occupying).

Figure 2:
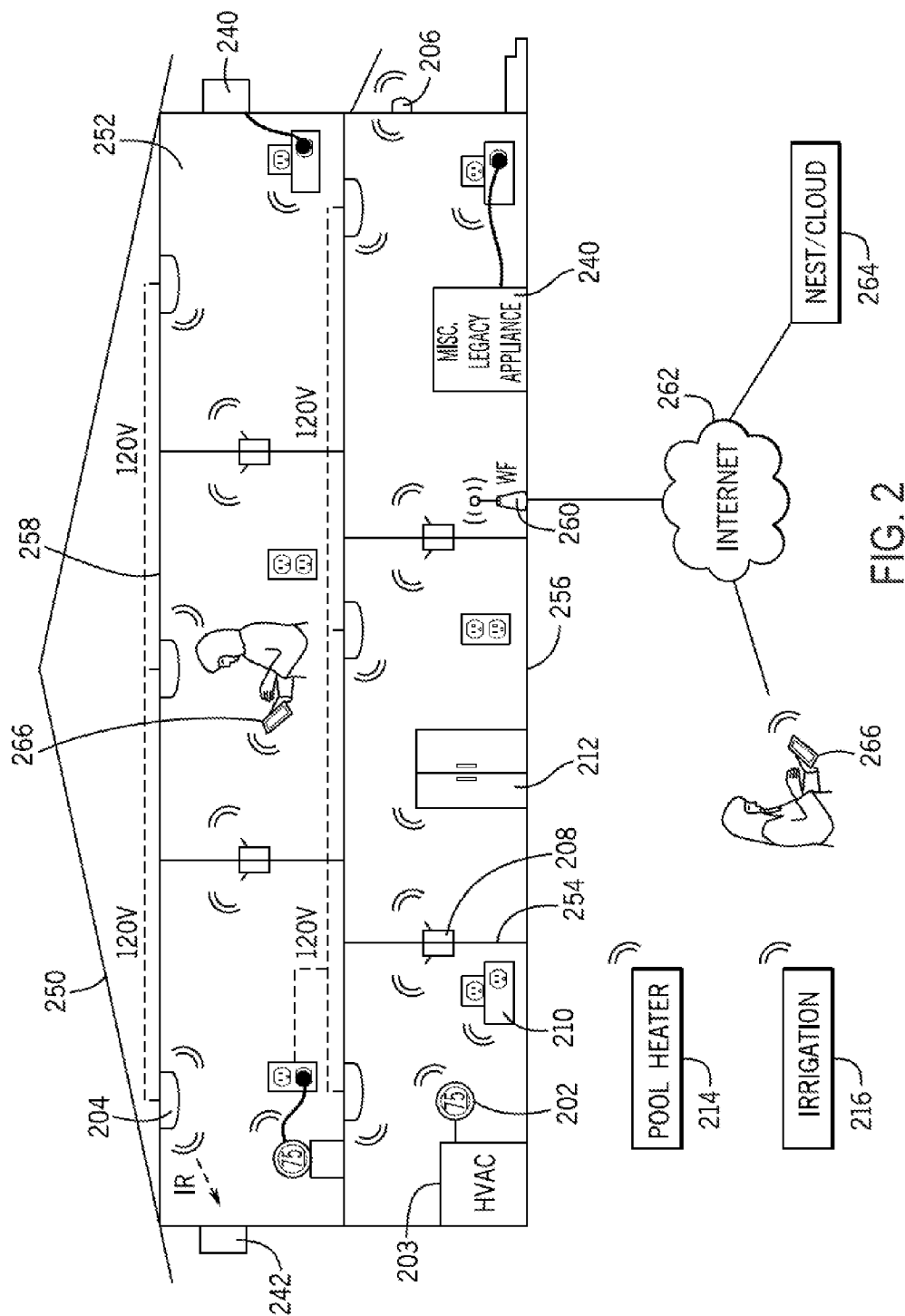
FIG. 2 illustrates a block diagram of a home environment in which the general device of FIG. 1 may communicate with other devices via the fabric network, in accordance with an embodiment.
Figure 3:
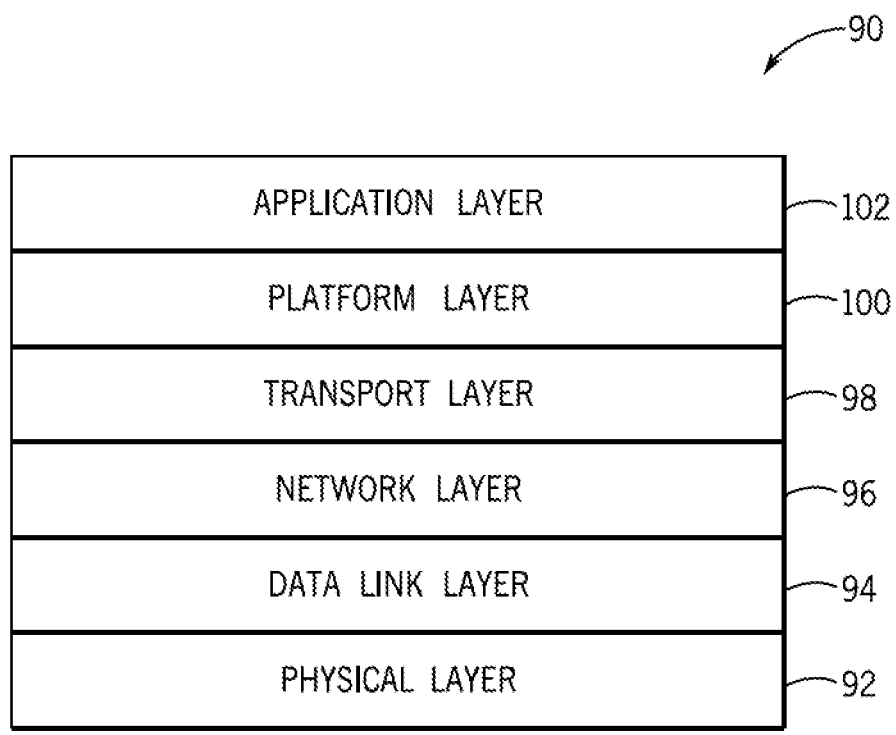
FIG. 3 illustrates a block diagram of an Open Systems Interconnection (OSI) model that characterizes a communication system for the home environment of FIG. 2, in accordance with an embodiment.

With the foregoing in mind, FIG. 2 illustrates a block diagram of a home environment 30 in which the device 10 of FIG. 1 may communicate with other devices via the fabric network. The depicted home environment 30 may include a structure 32 such as a house, office building, garage, or mobile home. It will be appreciated that devices can also be integrated into a home environment that does not include an entire structure 32, such as an apartment, condominium, office space, or the like. Further, the home environment 30 may control and/or be coupled to devices outside of the actual structure 32. Indeed, several devices in the home environment 30 need not physically be within the structure 32 at all. For example, a device controlling a pool heater 34 or irrigation system 36 may be located outside of the structure 32.

The depicted structure 32 includes multiple rooms 38, separated at least partly from each other via walls 40. The walls 40 can include interior walls or exterior walls. Each room 38 can further include a floor 42 and a ceiling 44. Devices can be mounted on, integrated with and/or supported by the wall 40, the floor 42, or the ceiling 44.

The home environment 30 may include multiple devices, including intelligent, multi-sensing, network-connected devices that may integrate seamlessly with each other and/or with cloud-based server systems to provide any of a variety of useful home objectives. One, more or each of the devices illustrated in the home environment 30 may include one or more sensors 12, a user interface 14, a power supply 16, a network interface 18, a processor 20 and the like.

Example devices 10 may include a network-connected thermostat 46 that may detect ambient climate characteristics (e.g., temperature and/or humidity) and control a heating, ventilation and air-conditioning (HVAC) system 48. Another example device 10 may include a hazard detection unit 50 that can detect the presence of a hazardous substance and/or a hazardous condition in the home environment 30 (e.g., smoke, fire, or carbon monoxide). Additionally, entryway interface devices 52, which can be termed a "smart doorbell", can detect a person's approach to or departure from a location, control audible functionality, announce a person's approach or departure via audio or visual means, or control settings on a security system (e.g., to activate or deactivate the security system).

In certain embodiments, the device 10 may include a light switch 54 that may detect ambient lighting conditions, detect room-occupancy states, and control a power and/or dim state of one or more lights. In some instances, the light switches 54 may control a power state or speed of a fan, such as a ceiling fan.

Additionally, wall plug interfaces 56 may detect occupancy of a room or enclosure and control supply of power to one or more wall plugs (e.g., such that power is not supplied to the plug if nobody is at home). The device 10 within the home environment 30 may further include an appliance 58, such as refrigerators, stoves and/or ovens, televisions, washers, dryers, lights (inside and/or outside the structure 32), stereos, intercom systems, garage-door openers, floor fans, ceiling fans, whole-house fans, wall air conditioners, pool heaters 34, irrigation systems 36, security systems, and so forth. While descriptions of FIG. 2 may identify specific sensors and functionalities associated with specific devices, it will be appreciated that any of a variety of sensors and functionalities (such as those described throughout the specification) may be integrated into the device 10.

In addition to containing processing and sensing capabilities, each of the example devices described above may be capable of data communications and information sharing with any other device, as well as to any cloud server or any other device that is network-connected anywhere in the world. In one embodiment, the devices 10 may send and receive communications via a fabric network discussed below. In one embodiment, fabric may enable the devices 10 to communicate with each other via one or more logical networks. As such, certain devices may serve as wireless repeaters and/or may function as bridges between devices, services, and/or logical networks in the home environment that may not be directly connected (i.e., one hop) to each other.

In one embodiment, a wireless router 60 may further communicate with the devices 10 in the home environment 30 via one or more logical networks (e.g., WiFi). The wireless router 60 may then communicate with the Internet 62 or other network such that each device 10 may communicate with a remote service or a cloud-computing system 64 through the Internet 62. The cloud-computing system 64 may be associated with a manufacturer, support entity or service provider associated with a particular device 10. As such, in one embodiment, a user may contact customer support using a device itself rather than using some other communication means such as a telephone or Internet-connected computer. Further, software updates can be automatically sent from the cloud-computing system 64 or devices in the home environment 30 to other devices in the fabric (e.g., when available, when purchased, when requested, or at routine intervals).

By virtue of network connectivity, one or more of the devices 10 may further allow a user to interact with the device even if the user is not proximate to the device. For example, a user may communicate with a device using a computer (e.g., a desktop computer, laptop computer, or tablet) or other portable electronic device (e.g., a smartphone) 66. A webpage or application may receive communications from the user and control the device 10 based on the received communications. Moreover, the webpage or application may present information about the device's operation to the user. For example, the user can view a current setpoint temperature for a device and adjust it using a computer that may be connected to the Internet 62. In this example, the thermostat 46 may receive the current setpoint temperature view request via the fabric network via one or more underlying logical networks.

In certain embodiments, the home environment 30 may also include a variety of non-communicating legacy appliances 68, such as old conventional washer/dryers, refrigerators, and the like which can be controlled, albeit coarsely (ON/OFF), by virtue of the wall plug interfaces 56. The home environment 30 may further include a variety of partially communicating legacy appliances 70, such as infra-red (IR) controlled wall air conditioners or other IR-controlled devices, which can be controlled by IR signals provided by the hazard detection units 50 or the light switches 54.

Figure 4:
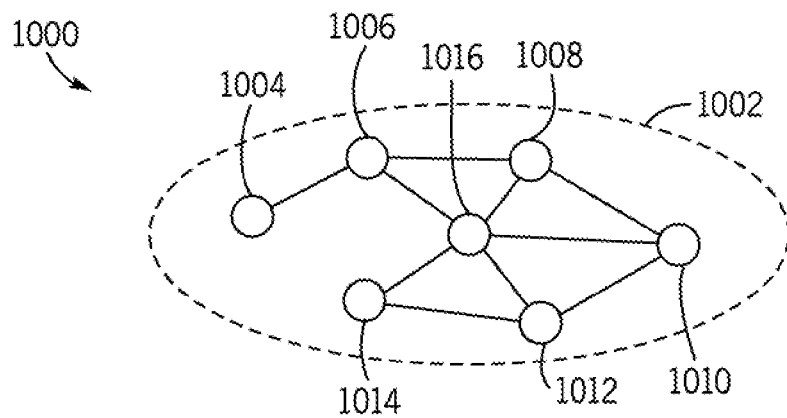
FIG. 4 illustrates the fabric network having a single logical network topology, in accordance with an embodiment.

As mentioned above, each of the example devices 10 described above may form a portion of a fabric network. Generally, the fabric network may be part of an Open Systems Interconnection (OSI) model 90 as depicted in FIG. 4. The OSI model 90 illustrates functions of a communication system with respect to abstraction layers. That is, the OSI model may specify a networking framework or how communications between devices may be implemented. In one embodiment, the OSI model may include six layers: a physical layer 92, a data link layer 94, a network layer 96, a transport layer 98, a platform layer 100, and an application layer 102. Generally, each layer in the OSI model 90 may serve the layer above it and may be served by the layer below it.

Keeping this in mind, the physical layer 92 may provide hardware specifications for devices that may communicate with each other. As such, the physical layer 92 may establish how devices may connect to each other, assist in managing how communication resources may be shared between devices, and the like.

The data link layer 94 may specify how data may be transferred between devices. Generally, the data link layer 94 may provide a way in which data packets being transmitted may be encoded and decoded into bits as part of a transmission protocol.

The network layer 96 may specify how the data being transferred to a destination node is routed. The network layer 96 may also provide a security protocol that may maintain the integrity of the data being transferred. The efficient network layer discussed above corresponds to the network layer 96. In certain embodiments, the network layer 96 may be completely independent of the platform layer 100 and include any suitable IPv6 network type (e.g., WiFi, Ethernet, HomePlug, 802.15.4, etc).

The transport layer 98 may specify a transparent transfer of the data from a source node to a destination node. The transport layer 98 may also control how the transparent transfer of the data remains reliable. As such, the transport layer 98 may be used to verify that data packets intended to transfer to the destination node indeed reached the destination node. Example protocols that may be employed in the transport layer 98 may include Transmission Control Protocol (TCP) and User Datagram Protocol (UDP).

The platform layer 100 includes the fabric network and establishes connections between devices according to the protocol specified within the transport layer 98 and may be agnostic of the network type used in the network layer 96. The platform layer 100 may also translate the data packets into a form that the application layer 102 may use. The application layer 102 may support a software application that may directly interface with the user. As such, the application layer 102 may implement protocols defined by the software application. For example, the software application may provide serves such as file transfers, electronic mail, and the like.

II. Fabric Device Interconnection

Figure 5:
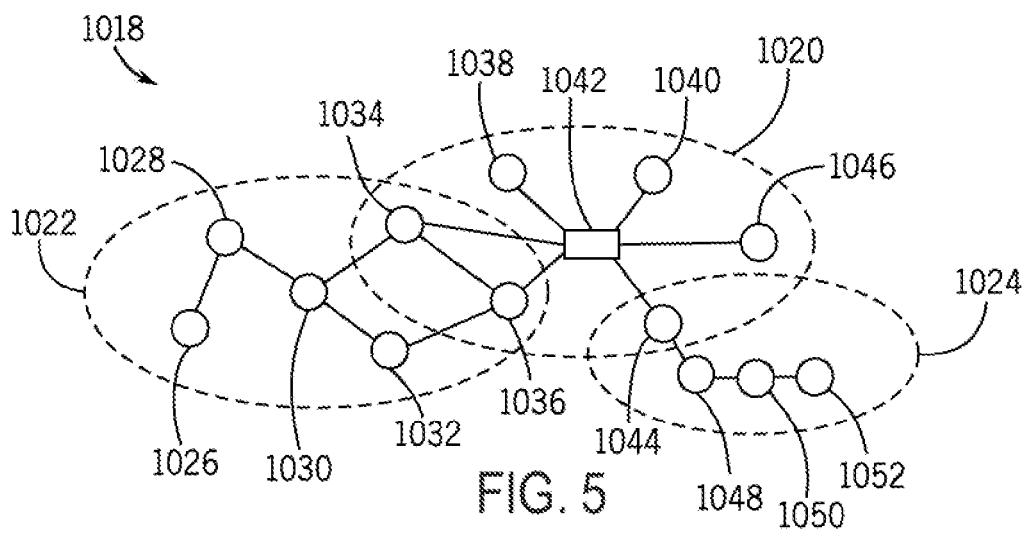
FIG. 5 illustrates the fabric network having a star network topology, in accordance with an embodiment.
Figure 6:
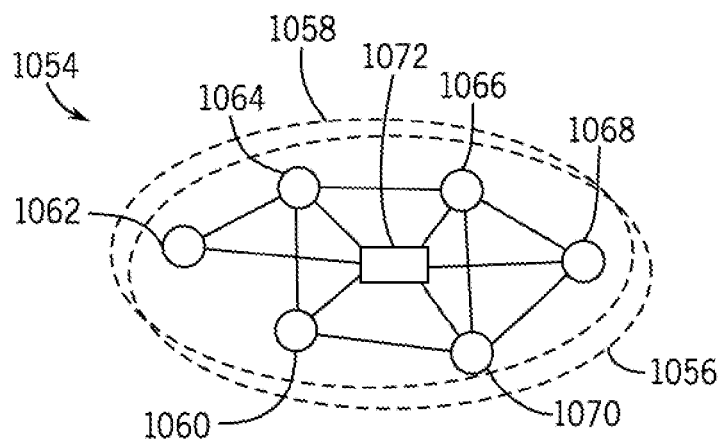
FIG. 6 illustrates the fabric network having an overlapping networks topology, in accordance with an embodiment.

As discussed above, a fabric may be implemented using one or more suitable communications protocols, such as IPv6 protocols. In fact, the fabric may be partially or completely agnostic to the underlying technologies (e.g., network types or communication protocols) used to implement the fabric. Within the one or more communications protocols, the fabric may be implemented using one or more network types used to communicatively couple electrical devices using wireless or wired connections. For example, certain embodiments of the fabric may include Ethernet, WiFi, 802.15.4, ZigBee, ISA100.11a, WirelessHART, MiWi™ power-line networks, and/or other suitable network types. Within the fabric devices (e.g., nodes) can exchange packets of information with other devices (e.g., nodes) in the fabric, either directly or via intermediary nodes, such as intelligent thermostats, acting as IP routers. These nodes may include manufacturer devices (e.g., thermostats and smoke detectors) and/or customer devices (e.g., phones, tablets, computers, etc.). Additionally, some devices may be "always on" and continuously powered using electrical connections. Other devices may have partially reduced power usage (e.g., medium duty cycle) using a reduced/intermittent power connection, such as a thermostat or doorbell power connection. Finally, some devices may have a short duty cycle and run solely on battery power. In other words, in certain embodiments, the fabric may include heterogeneous devices that may be connected to one or more sub-networks according to connection type and/or desired power usage. FIGS. 4-6 illustrate three embodiments that may be used to connect electrical devices via one or more sub-networks in the fabric.

A. Single Network Topology

FIG. 4 illustrates an embodiment of the fabric 1000 having a single network topology. As illustrated, the fabric 1000 includes a single logical network 1002. The network 1002 could include Ethernet, WiFi, 802.15.4, power-line networks, and/or other suitable network types in the IPv6 protocols. In fact, in some embodiments where the network 1002 includes a WiFi or Ethernet network, the network 1002 may span multiple WiFi and/or Ethernet segments that are bridged at a link layer.

The network 1002 includes one or more nodes 1004, 1006, 1008, 1010, 1012, 1014, and 1016, referred to collectively as 1004-1016. Although the illustrated network 1002 includes seven nodes, certain embodiments of the network 1002 may include one or more nodes interconnected using the network 1002. Moreover, if the network 1002 is a WiFi network, each of the nodes 1004-1016 may be interconnected using the node 1016 (e.g., WiFi router) and/or paired with other nodes using WiFi Direct (i.e., WiFi P2P).

B. Star Network Topology

FIG. 5 illustrates an alternative embodiment of fabric 1000 as a fabric 1018 having a star network topology. The fabric 1018 includes a hub network 1020 that joins together two periphery networks 1022 and 1024. The hub network 1020 may include a home network, such as WiFi/Ethernet network or power line network. The periphery networks 1022 and 1024 may additional network connection types different of different types than the hub network 1020. For example, in some embodiments, the hub network 1020 may be a WiFi/Ethernet network, the periphery network 1022 may include an 802.15.4 network, and the periphery network 1024 may include a power line network, a ZigBee® network, a ISA100.11a network, a WirelessHART, network, or a MiWi™ network. Moreover, although the illustrated embodiment of the fabric 1018 includes three networks, certain embodiments of the fabric 1018 may include any number of networks, such as 2, 3, 4, 5, or more networks. In fact, some embodiments of the fabric 1018 include multiple periphery networks of the same type.

Although the illustrated fabric 1018 includes fourteen nodes, each referred to individually by reference numbers 1024-1052, respectively, it should be understood that the fabric 1018 may include any number of nodes. Communication within each network 1020, 1022, or 1024, may occur directly between devices and/or through an access point, such as node 1042 in a WiFi/Ethernet network. Communications between periphery network 1022 and 1024 passes through the hub network 1020 using inter-network routing nodes. For example, in the illustrated embodiment, nodes 1034 and 1036 are be connected to the periphery network 1022 using a first network connection type (e.g., 802.15.4) and to the hub network 1020 using a second network connection type (e.g., WiFi) while the node 1044 is connected to the hub network 1020 using the second network connection type and to the periphery network 1024 using a third network connection type (e.g., power line). For example, a message sent from node 1026 to node 1052 may pass through nodes 1028, 1030, 1032, 1036, 1042, 1044, 1048, and 1050 in transit to node 1052.

C. Overlapping Networks Topology

FIG. 6 illustrates an alternative embodiment of the fabric 1000 as a fabric 1054 having an overlapping networks topology. The fabric 1054 includes networks 1056 and 1058. As illustrated, each of the nodes 1062, 1064, 1066, 1068, 1070, and 1072 may be connected to each of the networks. In other embodiments, the node 1072 may include an access point for an Ethernet/WiFi network rather than an end point and may not be present on either the network 1056 or network 1058, whichever is not the Ethernet/WiFi network. Accordingly, a communication from node 1062 to node 1068 may be passed through network 1056, network 1058, or some combination thereof. In the illustrated embodiment, each node can communicate with any other node via any network using any network desired. Accordingly, unlike the star network topology of FIG. 5, the overlapping networks topology may communicate directly between nodes via any network without using inter-network routing.

D. Fabric Network Connection to Services

Figure 7:
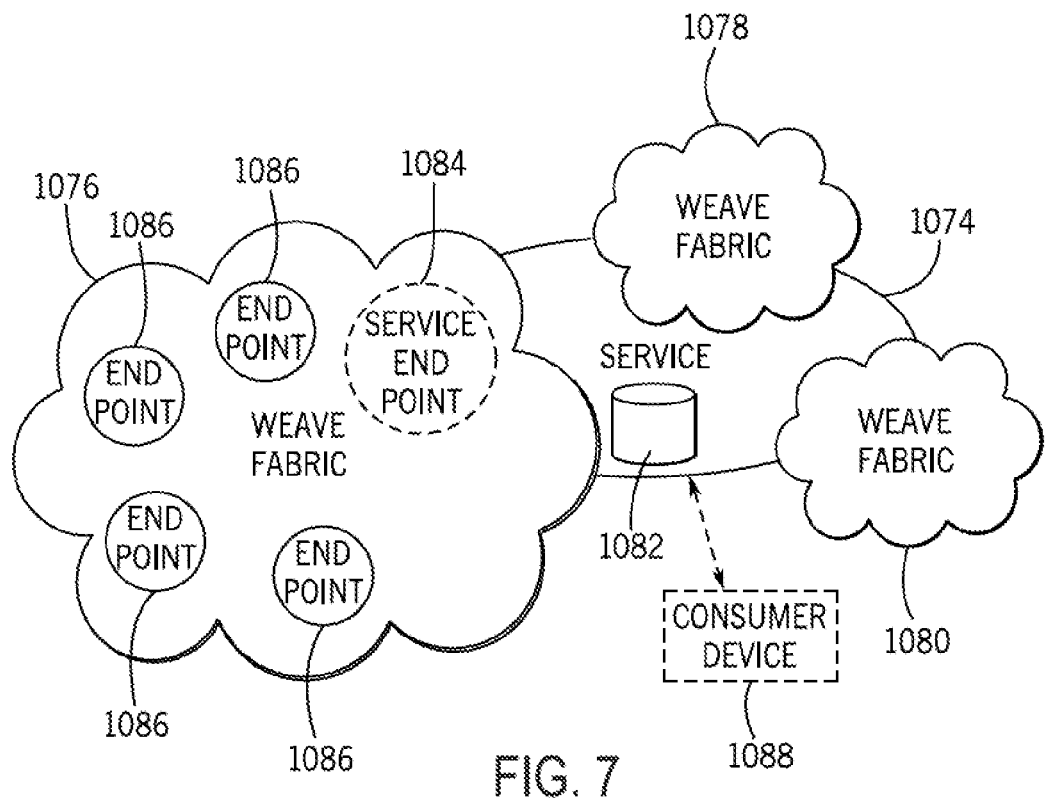
FIG. 7 illustrates a service communicating with one or more fabric networks, in accordance with an embodiment.

In addition to communications between devices within the home, a fabric (e.g., fabric 1000) may include services that may be located physically near other devices in the fabric or physically remote from such devices. The fabric connects to these services through one or more service end points. FIG. 7 illustrates an embodiment of a service 1074 communicating with fabrics 1076, 1078, and 1080. The service 1074 may include various services that may be used by devices in fabrics 1076, 1078, and/or 1080. For example, in some embodiments, the service 1074 may be a time of day service that supplies a time of day to devices, a weather service to provide various weather data (e.g., outside temperature, sunset, wind information, weather forecast, etc.), an echo service that "pings" each device, data management services, device management services, and/or other suitable services. As illustrated, the service 1074 may include a server 1082 (e.g., web server) that stores/accesses relevant data and passes the information through a service end point 1084 to one or more end points 1086 in a fabric, such as fabric 1076. Although the illustrated embodiment only includes three fabrics with a single server 1082, it should be appreciated that the service 1074 may connect to any number of fabrics and may include servers in addition to the server 1082 and/or connections to additional services.

In certain embodiments, the service 1074 may also connect to a consumer device 1088, such as a phone, tablet, and/or computer. The consumer device 1088 may be used to connect to the service 1074 via a fabric, such as fabric 1076, an Internet connection, and/or some other suitable connection method. The consumer device 1088 may be used to access data from one or more end points (e.g., electronic devices) in a fabric either directly through the fabric or via the service 1074. In other words, using the service 1074, the consumer device 1088 may be used to access/manage devices in a fabric remotely from the fabric.

E. Communication Between Devices in a Fabric

Figure 8:
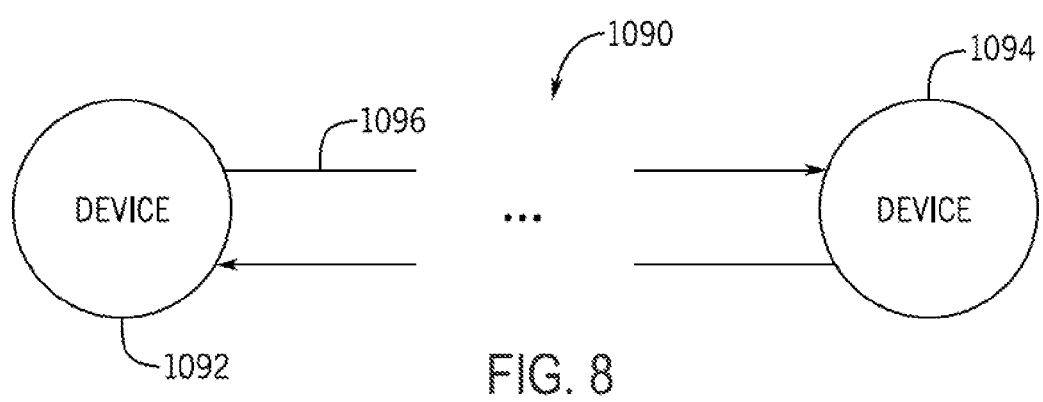
FIG. 8 illustrates two devices in a fabric network in communicative connection, in accordance with an embodiment.

As discussed above, each electronic device or node may communicate with any other node in the fabric, either directly or indirectly depending upon fabric topology and network connection types. Additionally, some devices (e.g., remote devices) may communicate through a service to communicate with other devices in the fabric. FIG. 8 illustrates an embodiment of a communication 1090 between two devices 1092 and 1094. The communication 1090 may span one or more networks either directly or indirectly through additional devices and/or services, as described above. Additionally, the communication 1090 may occur over an appropriate communication protocol, such as IPv6, using one or more transport protocols. For example, in some embodiments the communication 1090 may include using the transmission control protocol (TCP) and/or the user datagram protocol (UDP). In some embodiments, the device 1092 may transmit a first signal 1096 to the device 1094 using a connectionless protocol (e.g., UDP). In certain embodiments, the device 1092 may communicate with the device 1094 using a connection-oriented protocol (e.g., TCP). Although the illustrated communication 1090 is depicted as a bi-directional connection, in some embodiments, the communication 1090 may be a uni-directional broadcast.

i. Unique Local Address

As discussed above, data transmitted within a fabric received by a node may be redirected or passed through the node to another node depending on the desired target for the communication. In some embodiments, the transmission of the data may be intended to be broadcast to all devices. In such embodiments, the data may be retransmitted without further processing to determine whether the data should be passed along to another node. However, some data may be directed to a specific endpoint. To enable addressed messages to be transmitted to desired endpoints, nodes may be assigned identification information.

Each node may be assigned a set of link-local addresses (LLA), one assigned to each network interface. These LLAs may be used to communicate with other nodes on the same network. Additionally, the LLAs may be used for various communication procedures, such as IPv6 Neighbor Discovery Protocol. In addition to LLAs, each node is assigned a unique local address (ULA).

Figure 9:
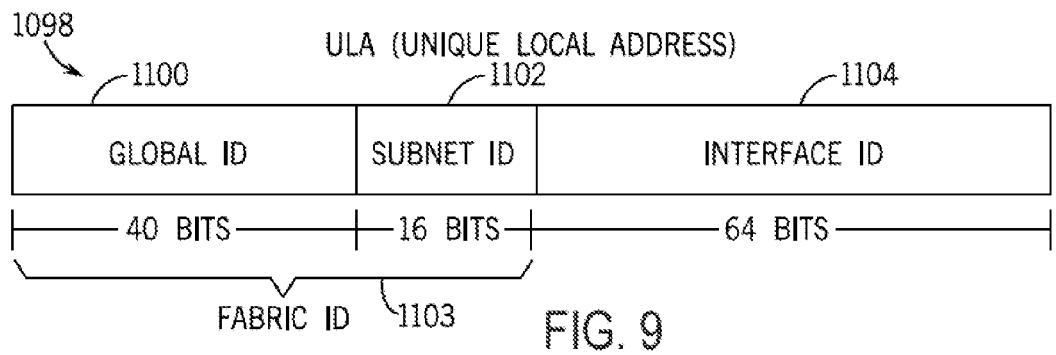
FIG. 9 illustrates a unique local address format (ULA) that may be used to address devices in a fabric network, in accordance with an embodiment.

FIG. 9 illustrates an embodiment of a unique local address (ULA) 1098 that may be used to address each node in the fabric. In certain embodiments, the ULA 1098 may be formatted as an IPv6 address format containing 128 bits divided into a global ID 1100, a subnet ID 1102, and an interface ID 1104. The global ID 1100 includes 40 bits and the subnet ID 1102 includes 16 bits. The global ID 1100 and subnet ID 1102 together form a fabric ID 1103 for the fabric.

The fabric ID 1103 is a unique 64-bit identifier used to identify a fabric. The fabric ID 1103 may be generated at creation of the associated fabric using a pseudo-random algorithm. For example, the pseudo-random algorithm may 1) obtain the current time of day in 64-bit NTP format, 2) obtain the interface ID 1104 for the device, 3) concatenate the time of day with the interface ID 1104 to create a key, 4) compute and SHA-1 digest on the key resulting in 160 bits, 5) use the least significant 40 bits as the global ID 1100, and 6) concatenate the ULA and set the least significant bit to 1 to create the fabric ID 1103. In certain embodiments, once the fabric ID 1103 is created with the fabric, the fabric ID 1103 remains until the fabric is dissolved.

The global ID 1100 identifies the fabric to which the node belongs. The subnet ID 1102 identifies logical networks within the fabric. The subnet ID 1102 may be assigned monotonically starting at one with the addition of each new logical network to the fabric. For example, a WiFi network may be identified with a hex value of 0x01, and a later connected 802.15.4 network may be identified with a hex value of 0x02 continuing on incrementally upon the connection of each new network to the fabric.

Finally, the ULA 1098 includes an interface ID 1104 that includes 64 bits. The interface ID 1104 may be assigned using a globally-unique 64-bit identifier according to the IEEE EUI-64 standard. For example, devices with IEEE 802 network interfaces may derive the interface ID 1104 using a burned-in MAC address for the devices "primary interface." In some embodiments, the designation of which interface is the primary interface may be determined arbitrarily. In other embodiments, an interface type (e.g., WiFi) may be deemed the primary interface, when present. If the MAC address for the primary interface of a device is 48 bits rather than 64-bit, the 48-bit MAC address may be converted to a EUI-64 value via encapsulation (e.g., organizationally unique identifier encapsulating). In consumer devices (e.g., phones or computers), the interface ID 1104 may be assigned by the consumer devices' local operating systems.

ii. Routing Transmissions Between Logical Networks

As discussed above in relation to a star network topology, inter-network routing may occur in communication between two devices across logical networks. In some embodiments, inter-network routing is based on the subnet ID 1102. Each inter-networking node (e.g., node 1034 of FIG. 5) may maintain a list of other routing nodes (e.g., node B 14 of FIG. 5) on the hub network 1020 and their respective attached periphery networks (e.g., periphery network 1024 of FIG. 5). When a packet arrives addressed to a node other than the routing node itself, the destination address (e.g., address for node 1052 of FIG. 5) is compared to the list of network prefixes and a routing node (e.g., node 1044) is selected that is attached to the desired network (e.g., periphery network 1024). The packet is then forwarded to the selected routing node. If multiple nodes (e.g., 1034 and 1036) are attached to the same periphery network, routing nodes are selected in an alternating fashion.

Additionally, inter-network routing nodes may regularly transmit Neighbor Discovery Protocol (NDP) router advertisement messages on the hub network to alert consumer devices to the existence of the hub network and allow them to acquire the subnet prefix. The router advertisements may include include one or more route information options to assist in routing information in the fabric. For example, these route information options may inform consumer devices of the existence of the periphery networks and how to route packets the periphery networks.

Figure 10:
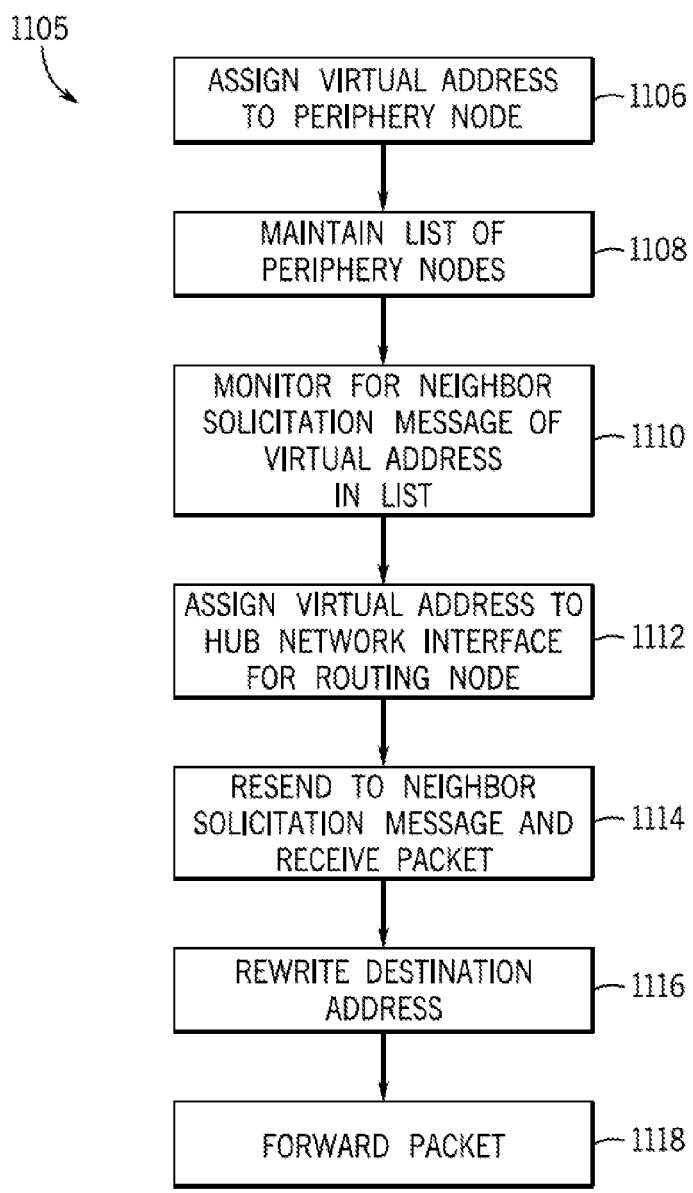
FIG. 10 illustrates a process for proxying periphery devices on a hub network, in accordance with an embodiment.

In addition to, or in place of route information options, routing nodes may act as proxies to provide a connection between consumer devices and devices in periphery networks, such as the process 1105 as illustrated in FIG. 10. As illustrated, the process 1105 includes each periphery network device being assigned a virtual address on the hub network by combining the subnet ID 1102 with the interface ID 1104 for the device on the periphery network (block 1106). To proxy using the virtual addresses, routing nodes maintain a list of all periphery nodes in the fabric that are directly reachable via one of its interfaces (block 1108). The routing nodes listen on the hub network for neighbor solicitation messages requesting the link address of a periphery node using its virtual address (block 1110). Upon receiving such a message, the routing node attempts to assign the virtual address to its hub interface after a period of time (block 1112). As part of the assignment, the routing node performs duplicate address detection so as to block proxying of the virtual address by more than one routing node. After the assignment, the routing node responds to the neighbor solicitation message and receives the packet (block 1114). Upon receiving the packet, the routing node rewrites the destination address to be the real address of the periphery node (block 1116) and forwards the message to the appropriate interface (block 1118).

iii. Consumer Devices Connecting to a Fabric

To join a fabric, a consumer device may discover an address of a node already in the fabric that the consumer device wants to join. Additionally, if the consumer device has been disconnected from a fabric for an extended period of time may need to rediscover nodes on the network if the fabric topology/layout has changed. To aid in discovery/rediscovery, fabric devices on the hub network may publish Domain Name System-Service Discovery (DNS-SD) records via mDNS that advertise the presence of the fabric and provide addresses to the consumer device III. Data Transmitted in the Fabric After creation of a fabric and address creation for the nodes, data may be transmitted through the fabric. Data passed through the fabric may be arranged in a format common to all messages and/or common to specific types of conversations in the fabric. In some embodiments, the message format may enable one-to-one mapping to JavaScript Object Notation (JSON) using a TLV serialization format discussed below. Additionally, although the following data frames are described as including specific sizes, it should be noted that lengths of the data fields in the data frames may be varied to other suitable bit-lengths.

It should be understood that each of the following data frames, profiles, and/or formats discussed below may be stored in memory (e.g., memory of the device 10) prior to and/or after transmission of a message. In other words, although the data frame, profiles, and formats may be generally discussed as transmissions of data, they may also be physically stored (e.g., in a buffer) before, during, and/or after transmission of the data frame, profiles, and/or formats. Moreover, the following data frames, profiles, schemas, and/or formats may be stored on a non-transitory, computer-readable medium that allows an electronic device to access the data frames, profiles, schemas, and/or formats. For example, instructions for formatting the data frames, profiles, schemas, and/or formats may be stored in any suitable computer-readable medium, such as in memory for the device 10, memory of another device, a portable memory device (e.g., compact disc, flash drive, etc.), or other suitable physical device suitable for storing the data frames, profiles, schemas, and/or formats.

A. Security

Along with data intended to be transferred, the fabric may transfer the data with additional security measures such as encryption, message integrity checks, and digital signatures. In some embodiments, a level of security supported for a device may vary according to physical security of the device and/or capabilities of the device. In certain embodiments, messages sent between nodes in the fabric may be encrypted using the Advanced Encryption Standard (AES) block cipher operating in counter mode (AES-CTR) with a 128-bit key. As discussed below, each message contains a 32-bit message id. The message id may be combined with a sending nodes id to form a nonce for the AES-CTR algorithm. The 32-bit counter enables 4 billion messages to be encrypted and sent by each node before a new key is negotiated.

In some embodiments, the fabric may insure message integrity using a message authentication code, such as HMAC-SHA-1, that may be included in each encrypted message. In some embodiments, the message authentication code may be generated using a 160-bit message integrity key that is paired one-to-one with the encryption key. Additionally, each node may check the message id of incoming messages against a list of recently received ids maintained on a node-by-node basis to block replay of the messages.

B. Tag Length Value (TLV) Formatting

To reduce power consumption, it is desirable to send at least a portion of the data sent over the fabric that compactly while enabling the data containers to flexibly represents data that accommodates skipping data that is not recognized or understood by skipping to the next location of data that is understood within a serialization of the data. In certain embodiments, tag-length-value (TLV) formatting may be used to compactly and flexibly encode/decode data. By storing at least a portion of the transmitted data in TLV, the data may be compactly and flexibly stored/sent along with low encode/decode and memory overhead, as discussed below in reference to Table 7. In certain embodiments, TLV may be used for some data as flexible, extensible data, but other portions of data that is not extensible may be stored and sent in an understood standard protocol data unit (PDU).

Data formatted in a TLV format may be encoded as TLV elements of various types, such as primitive types and container types. Primitive types include data values in certain formats, such as integers or strings. For example, the TLV format may encode: 1, 2, 3, 4, or 8 byte signed/unsigned integers, UTF-8 strings, byte strings, single/double-precision floating numbers (e.g., IEEE 754-1985 format), boolean, null, and other suitable data format types. Container types include collections of elements that are then sub-classified as container or primitive types. Container types may be classified into various categories, such as dictionaries, arrays, paths or other suitable types for grouping TLV elements, known as members. A dictionary is a collection of members each having distinct definitions and unique tags within the dictionary. An array is an ordered collection of members with implied definitions or no distinct definitions. A path is an ordered collection of members that described how to traverse a tree of TLV elements.

Figure 11:
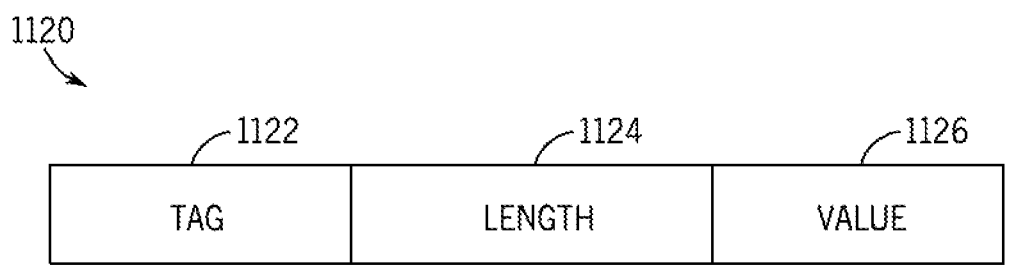
FIG. 11 illustrates a tag-length-value (TLV) packet that may be used to transmit data over the fabric network, in accordance with an embodiment.

As illustrated in FIG. 11, an embodiment of a TLV packet 1120 includes three data fields: a tag field 1122, a length field 1124, and a value field 1126. Although the illustrated fields 1122, 1124, and 1126 are illustrated as approximately equivalent in size, the size of each field may be variable and vary in size in relation to each other. In other embodiments, the TLV packet 1120 may further include a control byte before the tag field 1122.

In embodiments having the control byte, the control byte may be sub-divided into an element type field and a tag control field. In some embodiments, the element type field includes 5 lower bits of the control byte and the tag control field occupies the upper 3 bits. The element type field indicates the TLV element's type as well as the how the length field 1124 and value field 1126 are encoded. In certain embodiments, the element type field also encodes Boolean values and/or null values for the TLV. For example, an embodiment of an enumeration of element type field is provided in Table 1 below.

TABLE 1

Example element type field values.

| 7 | 6 | 5 | 4 | 3 | 2 | 1 | 0 | |
|---|---|---|---|---|---|---|---|---|
|   |   |   | 0 | 0 | 0 | 0 | 0 | Signed Integer, 1byte value |
|   |   |   | 0 | 0 | 0 | 0 | 1 | Signed Integer, 2byte value |
|   |   |   | 0 | 0 | 0 | 1 | 0 | Signed Integer, 4byte value |
|   |   |   | 0 | 0 | 0 | 1 | 1 | Signed Integer, 8byte value |
|   |   |   | 0 | 0 | 1 | 0 | 0 | Unsigned Integer, 1byte value |
|   |   |   | 0 | 0 | 1 | 0 | 1 | Unsigned Integer, 2byte value |
|   |   |   | 0 | 0 | 1 | 1 | 0 | Unsigned Integer, 4byte value |
|   |   |   | 0 | 0 | 1 | 1 | 1 | Unsigned Integer, 8byte value |
|   |   |   | 0 | 1 | 0 | 0 | 0 | Boolean False |
|   |   |   | 0 | 1 | 0 | 0 | 1 | Boolean True |
|   |   |   | 0 | 1 | 0 | 1 | 0 | Floating Point Number, 4byte value |
|   |   |   | 0 | 1 | 0 | 1 | 1 | Floating Point Number, 8byte value |
|   |   |   | 0 | 1 | 1 | 0 | 0 | UTF8-String, 1byte length |
|   |   |   | 0 | 1 | 1 | 0 | 1 | UTF8-String, 2byte length |
|   |   |   | 0 | 1 | 1 | 1 | 0 | UTF8-String, 4byte length |
|   |   |   | 0 | 1 | 1 | 1 | 1 | UTF8-String, 8byte length |
|   |   |   | 1 | 0 | 0 | 0 | 0 | Byte String, 1byte length |
|   |   |   | 1 | 0 | 0 | 0 | 1 | Byte String, 2byte length |
|   |   |   | 1 | 0 | 0 | 1 | 0 | Byte String, 4byte length |
|   |   |   | 1 | 0 | 0 | 1 | 1 | Byte String, 8byte length |
|   |   |   | 1 | 0 | 1 | 0 | 0 | Null |
|   |   |   | 1 | 0 | 1 | 0 | 1 | Dictionary |
|   |   |   | 1 | 0 | 1 | 1 | 0 | Array |
|   |   |   | 1 | 0 | 1 | 1 | 1 | Path |
|   |   |   | 1 | 1 | 0 | 0 | 0 | End of Container |

The tag control field indicates a form of the tag in the tag field 1122 assigned to the TLV element (including a zero-length tag). Examples, of tag control field values are provided in Table 2 below.

TABLE 2

Example values for tag control field.

| 7 | 6 | 5 | 4 | 3 | 2 | 1 | 0 | |
|---|---|---|---|---|---|---|---|---|
| 0 | 0 | 0 |   |   |   |   |   | Anonymous, 0 bytes |
| 0 | 0 | 1 |   |   |   |   |   | Context-specific Tag, 1 byte |
| 0 | 1 | 0 |   |   |   |   |   | Core Profile Tag, 2 bytes |
| 0 | 1 | 1 |   |   |   |   |   | Core Profile Tag, 4 bytes |
| 1 | 0 | 0 |   |   |   |   |   | Implicit Profile Tag, 2 bytes |
| 1 | 0 | 1 |   |   |   |   |   | Implicit Profile Tag, 4 bytes |
| 1 | 1 | 0 |   |   |   |   |   | Fully-qualified Tag, 6 bytes |

TABLE 2-continued

Example values for tag control field.

| 7 | 6 | 5 | 4 | 3 | 2 | 1 | 0 | |
|---|---|---|---|---|---|---|---|---|
| 1 | 1 | 1 | | | | | | Fully-qualified Tag, 8 bytes |

In other words, in embodiments having a control byte, the control byte may indicate a length of the tag.

In certain embodiments, the tag field 1122 may include zero to eight bytes, such as eight, sixteen, thirty two, or sixty four bits. In some embodiments, the tag of the tag field may be classified as profile-specific tags or context-specific tags. Profile-specific tags identify elements globally using a vendor Id, a profile Id, and/or tag number as discussed below. Context-specific tags identify TLV elements within a context of a containing dictionary element and may include a single-byte tag number. Since context-specific tags are defined in context of their containers, a single context-specific tag may have different interpretations when included in different containers. In some embodiments, the context may also be derived from nested containers.

In embodiments having the control byte, the tag length is encoded in the tag control field and the tag field 1122 includes a possible three fields: a vendor Id field, a profile Id field, and a tag number field. In the fully-qualified form, the encoded tag field 1122 includes all three fields with the tag number field including 16 or 32 bits determined by the tag control field. In the implicit form, the tag includes only the tag number, and the vendor Id and profile number are inferred from the protocol context of the TLV element. The core profile form includes profile-specific tags, as discussed above. Context-specific tags are encoded as a single byte conveying the tag number. Anonymous elements have zero-length tag fields 1122.

In some embodiments without a control byte, two bits may indicate a length of the tag field 1122, two bits may indicate a length of the length field 1124, and four bits may indicate a type of information stored in the value field 1126. An example of possible encoding for the upper 8 bits for the tag field is illustrated below in Table 3.

TABLE 3

Tag field of a TLV packet

| Byte 0 | | | | | | | | |
|---|---|---|---|---|---|---|---|---|
| 7 | 6 | 5 | 4 | 3 | 2 | 1 | 0 | Description |
| 0 | 0 | — | — | — | — | — | — | Tag is 8 bits |
| 0 | 1 | — | — | — | — | — | — | Tag is 16 bits |
| 1 | 0 | — | — | — | — | — | — | Tag is 32 bits |
| 1 | 1 | — | — | — | — | — | — | Tag is 64 bits |
| — | — | 0 | 0 | — | — | — | — | Length is 8 bits |
| — | — | 0 | 1 | — | — | — | — | Length is 16 bits |
| — | — | 1 | 0 | — | — | — | — | Length is 32 bits |
| — | — | 1 | 1 | — | — | — | — | Length is 64 bits |
| — | — | — | — | 0 | 0 | 0 | 0 | Boolean |
| — | — | — | — | 0 | 0 | 0 | 1 | Fixed 8-bit Unsigned |
| — | — | — | — | 0 | 0 | 1 | 0 | Fixed 8- bit Signed |
| — | — | — | — | 0 | 0 | 1 | 1 | Fixed 16-bit Unsigned |
| — | — | — | — | 0 | 1 | 0 | 0 | Fixed 16-bit Signed |
| — | — | — | — | 0 | 1 | 0 | 1 | Fixed 32-bit Unsigned |
| — | — | — | — | 0 | 1 | 1 | 0 | Fixed 32-bit Signed |
| — | — | — | — | 0 | 1 | 1 | 1 | Fixed 64-bit Unsigned |
| — | — | — | — | 1 | 0 | 0 | 0 | Fixed 64-bit Signed |
| — | — | — | — | 1 | 0 | 0 | 1 | 32-bit Floating Point |
| — | — | — | — | 1 | 0 | 1 | 0 | 64-bit Floating Point |
| — | — | — | — | 1 | 0 | 1 | 1 | UTF-8 String |
| — | — | — | — | 1 | 1 | 0 | 0 | Opaque Data |
| — | — | — | — | 1 | 1 | 0 | 1 | Container |

As illustrated in Table 3, the upper 8 bits of the tag field 1122 may be used to encode information about the tag field 1122, length field 1124, and the value field 1126, such that the tag field 112 may be used to determine length for the tag field 122 and the length fields 1124. Remaining bits in the tag field 1122 may be made available for user-allocated and/or user-assigned tag values.

The length field 1124 may include eight, sixteen, thirty two, or sixty four bits as indicated by the tag field 1122 as illustrated in Table 3 or the element field as illustrated in Table 2. Moreover, the length field 1124 may include an unsigned integer that represents a length of the encoded in the value field 1126. In some embodiments, the length may be selected by a device sending the TLV element. The value field 1126 includes the payload data to be decoded, but interpretation of the value field 1126 may depend upon the tag length fields, and/or control byte. For example, a TLV packet without a control byte including an 8 bit tag is illustrated in Table 4 below for illustration.

TABLE 4

Example of a TLV packet including an 8-bit tag

| Tag | Length | Value | Description |
|---|---|---|---|
| 0x0d | 0x24 | | |
| 0x09 | 0x04 | 0x42 95 00 00 | 74.5 |
| 0x09 | 0x04 | 0x42 98 66 66 | 76.2 |
| 0x09 | 0x04 | 0x42 94 99 9a | 74.3 |
| 0x09 | 0x04 | 0x42 98 99 9a | 76.3 |
| 0x09 | 0x04 | 0x42 95 33 33 | 74.6 |
| 0x09 | 0x04 | 0x42 98 33 33 | 76.1 |

As illustrated in Table 4, the first line indicates that the tag field 1122 and the length field 1124 each have a length of 8 bits. Additionally, the tag field 1122 indicates that the tag type is for the first line is a container (e.g., the TLV packet). The tag field 1124 for lines two through six indicate that each entry in the TLV packet has a tag field 1122 and length field 1124 consisting of 8 bits each. Additionally, the tag field 1124 indicates that each entry in the TLV packet has a value field 1126 that includes a 32-bit floating point. Each entry in the value field 1126 corresponds to a floating number that may be decoded using the corresponding tag field 1122 and length field 1124 information. As illustrated in this example, each entry in the value field 1126 corresponds to a temperature in Fahrenheit. As can be understood, by storing data in a TLV packet as described above, data may be transferred compactly while remaining flexible for varying lengths and information as may be used by different devices in the fabric. Moreover, in some embodiments, multi-byte integer fields may be transmitted in little-endian order or big-endian order.

By transmitting TLV packets in using an order protocol (e.g., little-endian) that may be used by sending/receiving device formats (e.g., JSON), data transferred between nodes may be transmitted in the order protocol used by at least one of the nodes (e.g., little endian). For example, if one or more nodes include ARM or ix86 processors, transmissions between the nodes may be transmitted using little-endian byte ordering to reduce the use of byte reordering. By reducing the inclusion of byte reordering, the TLV format enable devices to communicate using less power than a transmission that uses byte reordering on both ends of the transmission. Furthermore, TLV formatting may be specified to provide a one-to-one translation between other data storage techniques, such as JSON+ Extensible Markup Language (XML). As an example, the TLV format may be used to represent the following XML Property List:

```
<?xml version="1.0" encoding="UTF-8"?>
<!DOCTYPE plist PUBLIC "-//Apple Computer//DTD PLIST 1.0//EN"
"http://www.apple.com/DTDs/PropertyList-1.0.dtd">
<plist version="1.0">
<dict>
   <key>OfflineMode</key>
   <false/>
   <key>Network</key>
   <dict>
      <key>IPv4</key>
      <dict>
         <key>Method</key>
         <string>dhcp</string>
      </dict>
      <key>IPv6</key>
      <dict>
         <key>Method</key>
         <string>auto</string>
      </dict>
   </dict>
   <key>Technologies</key>
   <dict>
      <key>wifi</key>
      <dict>
         <key>Enabled</key>
         <true/>
         <key>Devices</key>
         <dict>
            <key>wifi_18b4300008b027</key>
            <dict>
               <key>Enabled</key>
               <true/>
            </dict>
         </dict>
         <key>Services</key>
         <array>
                <string>wifi_18b4300008b027_3939382d33204 16
            c70696e652054657 272616365</string>
         </array>
      </dict>
      <key>802.15.4</key>
      <dict>
         <key>Enabled</key>
         <true/>
         <key>Devices</key>
         <dict>
            <key>802.15.4_18b43000000002fac4</key>
            <dict>
               <key>Enabled</key>
               <true/>
            </dict>
         </dict>
         <key>Services</key>
         <array>
                <string>802.15.4_18b43000000002fac4_3 939382d332041
            6c70696e6520546572</string>
         </array>
      </dict>
   </dict>
   <key>Services</key>
   <dict>
      <key>wifi_18b4300008b027_3939382d3320416c70696e6520546572
   72616365</key>
      <dict>
         <key>Name</key>
         <string>998-3 Alpine Terrace</string>
         <key>SSID</key>
         <data>3939382d3320416c70696e652054657272616365</data>
      </data>
      <key>Frequency</key>
      <integer>2462</integer>
      <key>AutoConnect</key>
      <true/>
      <key>Favorite</key>
      <true/>
      <key>Error</key>
      <string/>
      <key>Network</key>
      <dict>
         <key>IPv4</key>
         <dict>
            <key>DHCP</key>
            <dict>
               <key>LastAddress</key>
               <data>0a02001e</data>
            </dict>
         </dict>
         <key>IPv6</key>
         <dict>
         </dict>
      </dict>
   </dict>
   <key>802.15.4_18b43000000002fac4_3939382d3320416c70696e
6520546572</key>
   <dict>
      <key>Name</key>
      <string>998-3 Alpine Ter</string>
      <key>EPANID</key>
      <data>3939382d3320416c70696e6520546572</data>
      <key>Frequency</key>
      <integer>2412</integer>
      <key>AutoConnect</key>
      <true/>
      <key>Favorite</key>
      <true/>
      <key>Error</key>
      <string/>
      <key>Network</key>
      <dict>
      </dict>
   </dict>
</dict>
</plist>
```

As an example, the above property list may be represented in tags of the above described TLV format (without a control byte) according to Table 5 below.

TABLE 5

Example representation of
the XML Property List in TLV format

| XML Key | Tag Type | Tag Number |
| --- | --- | --- |
| OfflineMode | Boolean | 1 |
| IPv4 | Container | 3 |
| IPv6 | Container | 4 |
| Method | String | 5 |
| Technologies | Container | 6 |
| WiFi | Container | 7 |
| 802.15.4 | Container | 8 |
| Enabled | Boolean | 9 |
| Devices | Container | 10 |
| ID | String | 11 |
| Services | Container | 12 |
| Name | String | 13 |
| SSID | Data | 14 |
| EPANID | Data | 15 |
| Frequency | 16-bit Unsigned | 16 |
| AutoConnect | Boolean | 17 |
| Favorite | Boolean | 18 |
| Error | String | 19 |
| DHCP | String | 20 |
| LastAddress | Data | 21 |

TABLE 5-continued

Example representation of
the XML Property List in TLV format

| XML Key | Tag Type | Tag Number |
|---------|----------|------------|
| Device  | Container | 22 |
| Service | Container | 23 |

Similarly, Table 6 illustrates an example of literal tag, length, and value representations for the example XML Property List.

TABLE 6

Example of literal values for tag,
length, and value fields for XML Property List

| Tag | Length | Value | Description |
|-----|--------|-------|-------------|
| 0x40 01 | 0x01 | 0 | OfflineMode |
| 0x4d 02 | 0x14 | | Network |
| 0x4d 03 | 0x07 | | Network.IPv4 |
| 0x4b 05 | 0x04 | "dhcp" | Network.IPv4.Method |
| 0x4d 04 | 0x07 | | Network.IPv6 |
| 0x4b 05 | 0x04 | "auto" | Network.IPv6.Method |
| 0x4d 06 | 0xd6 | | Technologies |
| 0x4d 07 | 0x65 | | Technologies.wifi |
| 0x40 09 | 0x01 | 1 | Technologies.wifi.Enabled |
| 0x4d 0a | 0x5e | | Technologies.wifi.Devices |
| 0x4d 16 | 0x5b | | Technologies.wifi.Devices.Device.[0] |
| 0x4b 0b | 0x13 | "wifi_18b43 . . ." | Technologies.wifi.Devices.Device.[0].ID |
| 0x40 09 | 0x01 | 1 | Technologies.wifi.Devices.Device.[0].Enabled |
| 0x4d 0c | 0x3e | | Technologies.wifi.Devices.Device.[0].Services |
| 0x0b | 0x 3c | "wifi_18b43 . . ." | Technologies.wifi.Devices.Device.[0].Services.[0] |
| 0x4d 08 | 0x6b | | Technologies.802.15.4 |
| 0x40 09 | 0x01 | 1 | Technologies.802.15.4.Enabled |
| 0x4d 0a | 0x64 | | Technologies.802.15.4.Devices |
| 0x4d 16 | 0x61 | | Technologies.802.15.4.Devices.Device.[0] |
| 0x4b 0b | 0x1a | "802.15.4_18 . . ." | Technologies.802.15.4.Devices.Device.[0].ID |
| 0x40 09 | 0x01 | 1 | Technologies.802.15.4.Devices..Device.[0]Enabled |
| 0x4d 0c | 0x3d | | Technologies.802.15.4.Devices.Device.[0].Services |
| 0x0b | 0x 3b | "802.15.4_18 . . ." | Technologies.802.15.4.Devices.Device.[0].Services.[0] |
| 0x4d 0c | 0xcb | | Services |
| 0x4d 17 | 0x75 | | Services.Service.[0] |
| 0x4b 0b | 0x13 | "wifi_18b43 . . ." | Services.Service.[0].ID |
| 0x4b 0d | 0x14 | "998-3 Alp . . ." | Services.Service.[0].Name |
| 0x4c 0f | 0x28 | 3939382d . . . | Services.Service.[0].SSID |
| 0x45 10 | 0x02 | 2462 | Services.Service.[0].Frequency |
| 0x40 11 | 0x01 | 1 | Services.Service.[0].AutoConnect |
| 0x40 12 | 0x01 | 1 | Services.Service.[0].Favorite |
| 0x4d 02 | 0x0d | | Services.Service.[0].Network |
| 0x4d 03 | 0x0a | | Services.Service.[0].Network.IPv4 |
| 0x4d 14 | 0x07 | | Services.Service.[0].Network.IPv4.DHCP |
| 0x45 15 | 0x04 | 0x0a02001e | Services.Service.[0].Network.IPv4.LastAddress |
| 0x4d 17 | 0x50 | | Services.Service.[1] |
| 0x4b 0b | 0x1a | "802.15.4_18 . . ." | Services.Service. [1].ID |
| 0x4c 0d | 0x10 | "998-3 Alp . . ." | Services.Service.[1].Name |
| 0x4c 0f | 0x10 | 3939382d . . . | Services.Service.[1].EPANID |
| 0x45 10 | 0x02 | 2412 | Services.Service.[1].Frequency |
| 0x40 11 | 0x01 | 1 | Services.Service.[1].AutoConnect |
| 0x40 12 | 0x01 | 1 | Services.Service.[1].Favorite |

The TLV format enables reference of properties that may also be enumerated with XML, but does so with a smaller storage size. For example, Table 7 illustrates a comparison of data sizes of the XML Property List, a corresponding binary property list, and the TLV format.

TABLE 7

Comparison of the sizes of property list data sizes.

| List Type | Size in Bytes | Percentage of XML Size |
|-----------|---------------|------------------------|
| XML | 2,199 | — |
| Binary | 730 | −66.8% |
| TLV | 450 | −79.5% |

By reducing the amount of data used to transfer data, the TLV format enables the fabric 1000 transfer data to and/or from devices having short duty cycles due to limited power (e.g., battery supplied devices). In other words, the TLV format allows flexibility of transmission while increasing compactness of the data to be transmitted.

C. General Message Protocol

Figure 12:
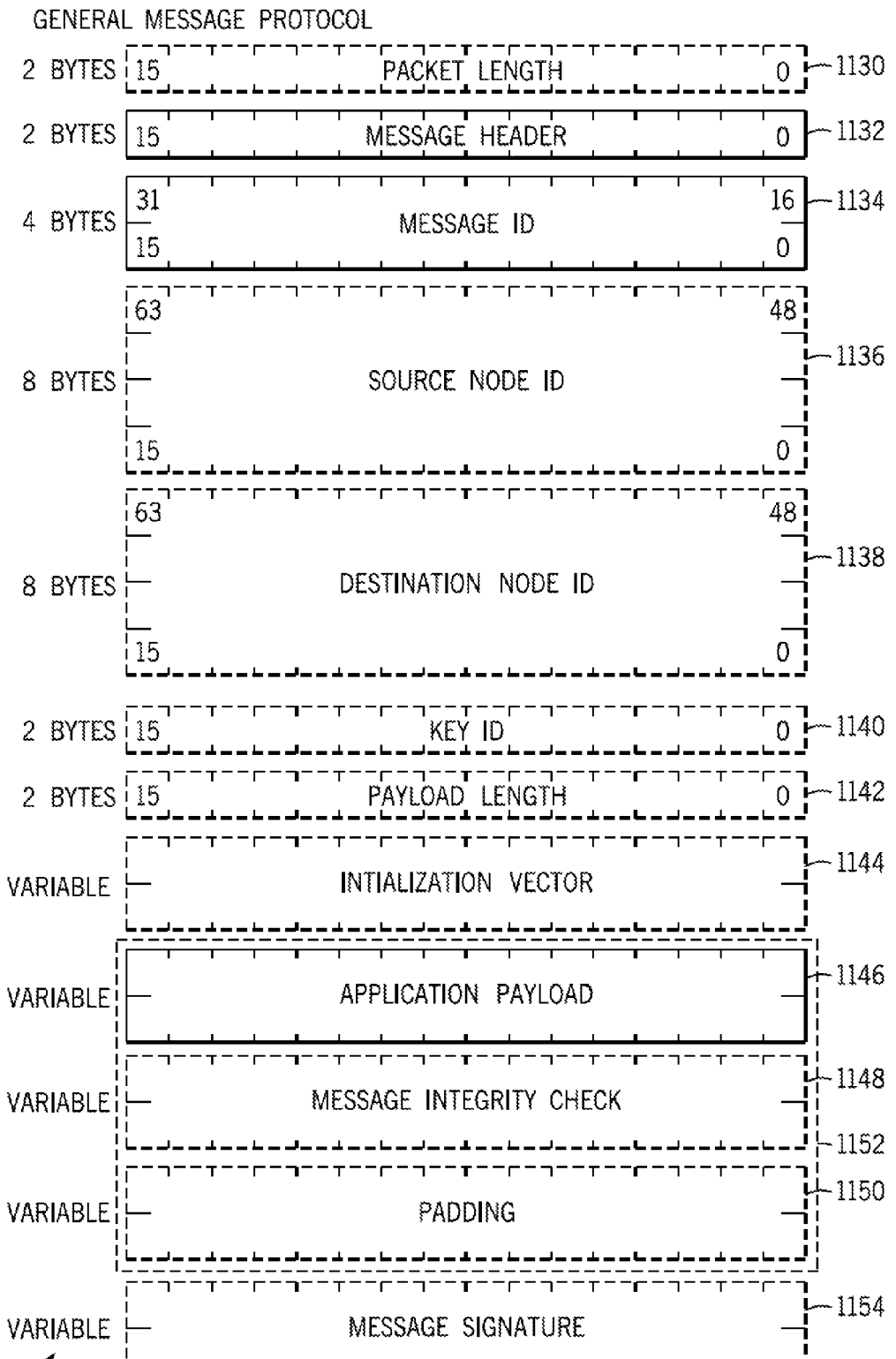
FIG. 12 illustrates a general message protocol (GMP) that may be used to transmit data over the fabric network that may include the TLV packet of FIG. 11, in accordance with an embodiment.

In addition to sending particular entries of varying sizes, data may be transmitted within the fabric using a general message protocol that may incorporate TLV formatting. An embodiment of a general message protocol (GMP) 1128 is illustrated in FIG. 12. In certain embodiments, the general message protocol (GMP) 1128 may be used to transmit data within the fabric. The GMP 1128 may be used to transmit data via connectionless protocols (e.g., UDP) and/or connection-oriented protocols (e.g., TCP). Accordingly, the GMP 1128 may flexibly accommodate information that is used in one protocol while ignoring such information when using another protocol. Moreover, the GMP 1226 may enable omission of fields that are not used in a specific transmission. Data that may be omitted from one or more GMP 1226 transfers is generally indicated using grey borders around the data units. In some embodiments, the multi-byte integer fields may be transmitted in a little-endian order or a big-endian order.

i. Packet Length

In some embodiments, the GMP 1128 may include a Packet Length field 1130. In some embodiments, the Packet Length field 1130 includes 2 bytes. A value in the Packet Length field 1130 corresponds to an unsigned integer indicating an overall length of the message in bytes, excluding the Packet Length field 1130 itself. The Packet Length field 1130 may be present when the GMP 1128 is transmitted over a TCP connection, but when the GMP 1128 is transmitted over a UDP connection, the message length may be equal to the payload length of the underlying UDP packet obviating the Packet Length field 1130.

ii. Message Header

Figure 13:
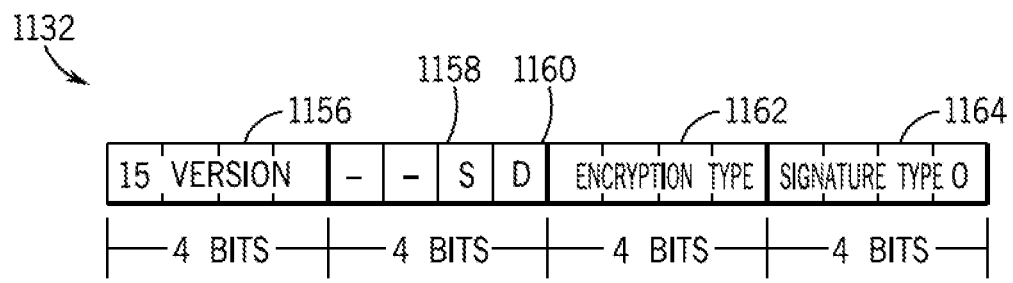
FIG. 13 illustrates a message header field of the GMP of FIG. 12, in accordance with an embodiment.

The GMP 1128 may also include a Message Header 1132 regardless of whether the GMP 1128 is transmitted using TCP or UDP connections. In some embodiments, the Message Header 1132 includes two bytes of data arranged in the format illustrated in FIG. 13. As illustrated in FIG. 13, the Message Header 1132 includes a Version field 1156. The Version field 1156 corresponds to a version of the GMP 1128 that is used to encode the message. Accordingly, as the GMP 1128 is updated, new versions of the GMP 1128 may be created, but each device in a fabric may be able to receive a data packet in any version of GMP 1128 known to the device. In addition to the Version field 1156, the Message Header 1132 may include an S Flag field 1158 and a D Flag 1160. The S Flag 1158 is a single bit that indicates whether a Source Node Id (discussed below) field is included in the transmitted packet. Similarly, the D Flag 1160 is a single bit that indicates whether a Destination Node Id (discussed below) field is included in the transmitted packet.

The Message Header 1132 also includes an Encryption Type field 1162. The Encryption Type field 1162 includes four bits that specify which type of encryption/integrity checking applied to the message, if any. For example, 0x0 may indicate that no encryption or message integrity checking is included, but a decimal 0x1 may indicate that AES-128-CTR encryption with HMAC-SHA-1 message integrity checking is included.

Finally, the Message Header 1132 further includes a Signature Type field 1164. The Signature Type field 1164 includes four bits that specify which type of digital signature is applied to the message, if any. For example, 0x0 may indicate that no digital signature is included in the message, but 0x1 may indicate that the Elliptical Curve Digital Signature Algorithm (ECDSA) with Prime256v1 elliptical curve parameters is included in the message.

iii. Message Id

Returning to FIG. 12, the GMP 1128 also includes a Message Id field 1134 that may be included in a transmitted message regardless of whether the message is sent using TCP or UDP. The Message Id field 1134 includes four bytes that correspond to an unsigned integer value that uniquely identifies the message from the perspective of the sending node. In some embodiments, nodes may assign increasing Message Id 1134 values to each message that they send returning to zero after reaching $2^{32}$ messages.

iv. Source Node Id

In certain embodiments, the GMP 1128 may also include a Source Node Id field 1136 that includes eight bytes. As discussed above, the Source Node Id field 1136 may be present in a message when the single-bit S Flag 1158 in the Message Header 1132 is set to 1. In some embodiments, the Source Node Id field 1136 may contain the Interface ID 1104 of the ULA 1098 or the entire ULA 1098. In some embodiments, the bytes of the Source Node Id field 1136 are transmitted in an ascending index-value order (e.g., EUI[0] then EUI[1] then EUI[2] then EUI[3], etc.).

v. Destination Node Id

The GMP 1128 may include a Destination Node Id field 1138 that includes eight bytes. The Destination Node Id field 1138 is similar to the Source Node Id field 1136, but the Destination Node Id field 1138 corresponds to a destination node for the message. The Destination Node Id field 1138 may be present in a message when the single-bit D Flag 1160 in the Message Header 1132 is set to 1. Also similar to the Source Node Id field 1136, in some embodiments, bytes of the Destination Node Id field 1138 may be transmitted in an ascending index-value order (e.g., EUI[0] then EUI[1] then EUI[2] then EUI[3], etc.).

vi. Key Id

In some embodiments, the GMP 1128 may include a Key Id field 1140. In certain embodiments, the Key Id field 1140 includes two bytes. The Key Id field 1140 includes an unsigned integer value that identifies the encryption/message integrity keys used to encrypt the message. The presence of the Key Id field 1140 may be determined by the value of Encryption Type field 1162 of the Message Header 1132. For example, in some embodiments, when the value for the Encryption Type field 1162 of the Message Header 1132 is 0x0, the Key Id field 1140 may be omitted from the message.

Figure 14:
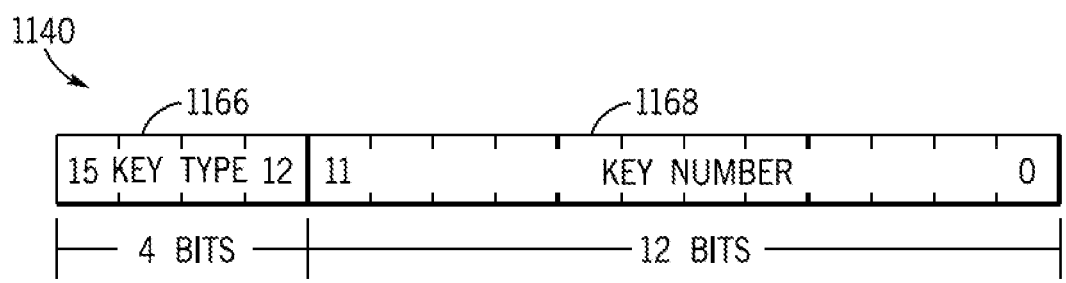
FIG. 14 illustrates a key identifier field of the GMP of FIG. 12, in accordance with an embodiment.

An embodiment of the Key Id field 1140 is presented in FIG. 14. In the illustrated embodiment, the Key Id field 1140 includes a Key Type field 1166 and a Key Number field 1168. In some embodiments, the Key Type field 1166 includes four bits. The Key Type field 1166 corresponds to an unsigned integer value that identifies a type of encryption/message integrity used to encrypt the message. For example, in some embodiments, if the Key Type field 1166 is 0x0, the fabric key is shared by all or most of the nodes in the fabric. However, if the Key Type field 1166 is 0x1, the fabric key is shared by a pair of nodes in the fabric.

The Key Id field 1140 also includes a Key Number field 1168 that includes twelve bits that correspond to an unsigned integer value that identifies a particular key used to encrypt the message out of a set of available keys, either shared or fabric keys.

vii. Payload Length

In some embodiments, the GMP 1128 may include a Payload Length field 1142. The Payload Length field 1142, when present, may include two bytes. The Payload Length field 1142 corresponds to an unsigned integer value that indicates a size in bytes of the Application Payload field. The Payload Length field 1142 may be present when the message is encrypted using an algorithm that uses message padding, as described below in relation to the Padding field.

viii. Initialization Vector

In some embodiments, the GMP 1128 may also include an Initialization Vector (IV) field 1144. The IV field 1144, when present, includes a variable number of bytes of data. The IV field 1144 contains cryptographic IV values used to encrypt the message. The IV field 1144 may be used when the message is encrypted with an algorithm that uses an IV. The length of the IV field 1144 may be derived by the type of encryption used to encrypt the message.

ix. Application Payload

The GMP 1128 includes an Application Payload field 1146. The Application Payload field 1146 includes a variable number of bytes. The Application Payload field 1146 includes application data conveyed in the message. The length of the Application Payload field 1146 may be determined from the Payload Length field 1142, when present. If the Payload Length field 1142 is not present, the length of the Application Payload field 1146 may be determined by subtracting the length of all other fields from the overall length of the message and/or data values included within the Application Payload 1146 (e.g., TLV).

Figure 15:
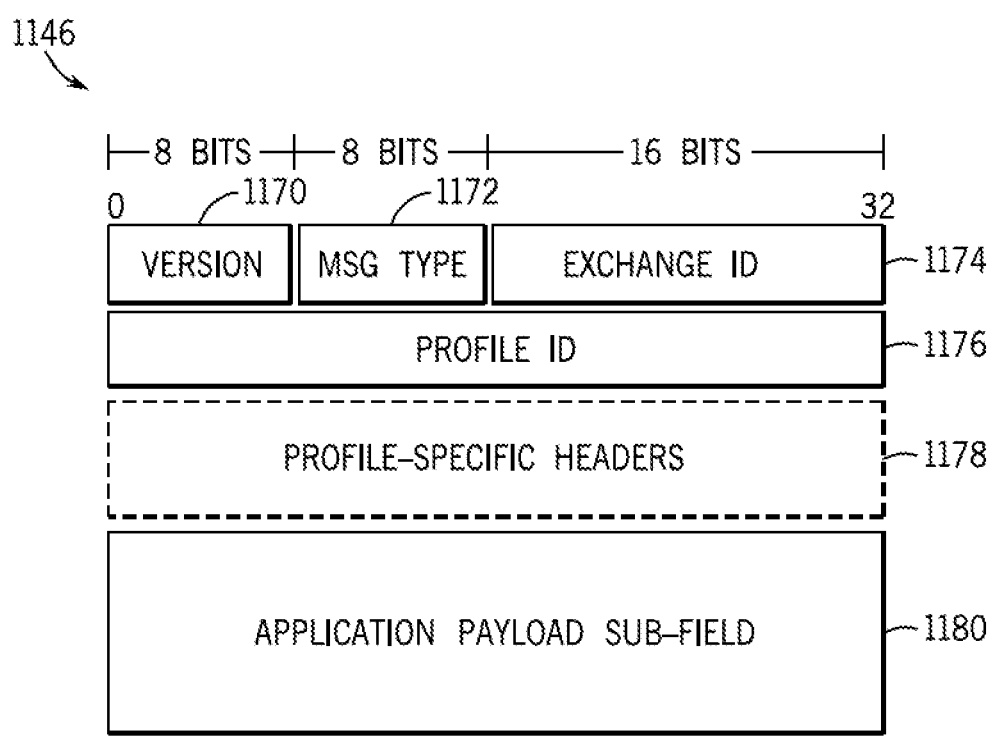
FIG. 15 illustrates an application payload field of the GMP of FIG. 12, in accordance with an embodiment.

An embodiment of the Application Payload field 1146 is illustrated in FIG. 15. The Application Payload field 1146 includes an APVersion field 1170. In some embodiments, the APVersion field 1170 includes eight bits that indicate what version of fabric software is supported by the sending device. The Application Payload field 1146 also includes a Message Type field 1172. The Message Type field 1172 may include eight bits that correspond to a message operation code that indicates the type of message being sent within a profile. For example, in a software update profile, a 0x00 may indicate that the message being sent is an image announce. The Application Payload field 1146 further includes an Exchange Id field 1174 that includes sixteen bits that corresponds to an exchange identifier that is unique to the sending node for the transaction.

In addition, the Application Payload field 1146 includes a Profile Id field 1176. The Profile Id 1176 indicates a "theme of discussion" used to indicate what type of communication occurs in the message. The Profile Id 1176 may correspond to one or more profiles that a device may be capable of communicating. For example, the Profile Id 1176 may indicate that the message relates to a core profile, a software update profile, a status update profile, a data management profile, a climate and comfort profile, a security profile, a safety profile, and/or other suitable profile types. Each device on the fabric may include a list of profiles which are relevant to the device and in which the device is capable of "participating in the discussion." For example, many devices in a fabric may include the core profile, the software update profile, the status update profile, and the data management profile, but only some devices would include the climate and comfort profile. The APVersion field 1170, Message Type field 1172, the Exchange Id field, the Profile Id field 1176, and the Profile-Specific Header field 1176, if present, may be referred to in combination as the "Application Header."

In some embodiments, an indication of the Profile Id via the Profile Id field 1176 may provide sufficient information to provide a schema for data transmitted for the profile. However, in some embodiments, additional information may be used to determine further guidance for decoding the Application Payload field 1146. In such embodiments, the Application Payload field 1146 may include a Profile-Specific Header field 1178. Some profiles may not use the Profile-Specific Header field 1178 thereby enabling the Application Payload field 1146 to omit the Profile-Specific Header field 1178. Upon determination of a schema from the Profile Id field 1176 and/or the Profile-Specific Header field 1178, data may be encoded/decoded in the Application Payload sub-field 1180. The Application Payload sub-field 1180 includes the core application data to be transmitted between devices and/or services to be stored, rebroadcast, and/or acted upon by the receiving device/service.

x. Message Integrity Check

Returning to FIG. 12, in some embodiments, the GMP 1128 may also include a Message Integrity Check (MIC) field 1148. The MIC field 1148, when present, includes a variable length of bytes of data containing a MIC for the message. The length and byte order of the field depends upon the integrity check algorithm in use. For example, if the message is checked for message integrity using HMAC-SHA-1, the MIC field 1148 includes twenty bytes in big-endian order. Furthermore, the presence of the MIC field 1148 may be determined by whether the Encryption Type field 1162 of the Message Header 1132 includes any value other than 0x0.

xi. Padding

The GMP 1128 may also include a Padding field 1150. The Padding field 1150, when present, includes a sequence of bytes representing a cryptographic padding added to the message to make the encrypted portion of the message evenly divisible by the encryption block size. The presence of the Padding field 1150 may be determined by whether the type of encryption algorithm (e.g., block ciphers in cipher-block chaining mode) indicated by the Encryption Type field 1162 in the Message Header 1132 uses cryptographic padding.

xii. Encryption

The Application Payload field 1146, the MIC field 1148, and the Padding field 1150 together form an Encryption block 1152. The Encryption block 1152 includes the portions of the message that are encrypted when the the Encryption Type field 1162 in the Message Header 1132 is any value other than 0x0.

xiii. Message Signature

The GMP 1128 may also include a Message Signature field 1154. The Message Signature field 1154, when present, includes a sequence of bytes of variable length that contains a cryptographic signature of the message. The length and the contents of the Message Signature field may be determined according to the type of signature algorithm in use and indicated by the Signature Type field 1164 of the Message Header 1132. For example, if ECDSA using the Prime256v1 elliptical curve parameters is the algorithm in use, the Message Signature field 1154 may include two thirty-two bit integers encoded in little-endian order.

IV. Profiles and Protocols

As discussed above, one or more schemas of information may be selected upon desired general discussion type for the message. A profile may consist of one or more schemas. For example, one set of schemas of information may be used to encode/decode data in the Application Payload sub-field 1180 when one profile is indicated in the Profile Id field 1176 of the Application Payload 1146. However, a different set of schemas may be used to encode/decode data in the Application Payload sub-field 1180 when a different profile is indicated in the Profile Id field 1176 of the Application Payload 1146.

Figure 16:
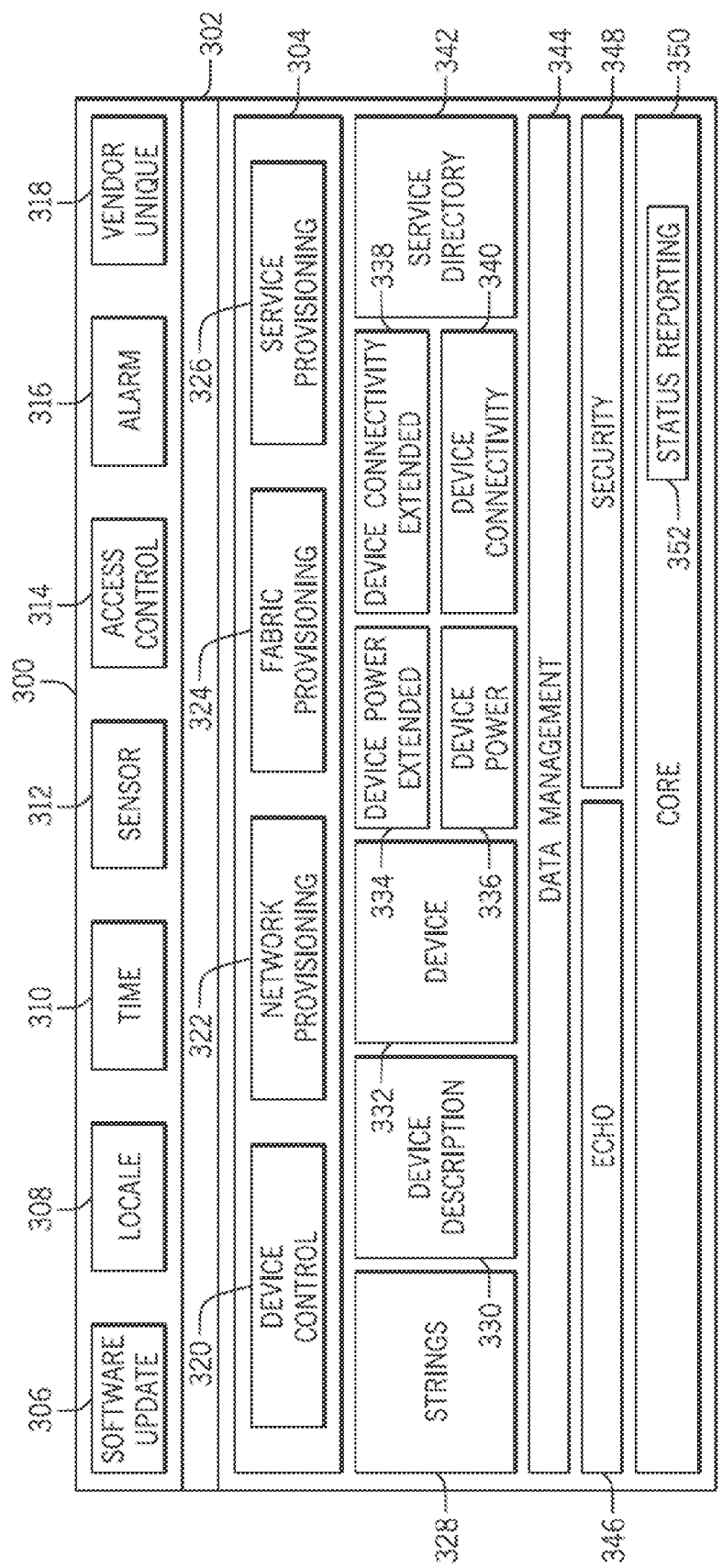
FIG. 16 illustrates a profile library that includes various profiles that may be used in the application payload field of FIG. 15.

FIG. 16 illustrates a schematic view of a variety of profiles that may be used in various messages. For example, one or more profile schemas may be stored in a profile library 300 that may be used by the devices to encode or decode messages based on a profile ID. The profile library 300 may organize the profiles into groups. For example, an application- and vendor-specific profile group 302 of profiles may be application- and vendor-specific profiles, and a provisioning group 304 of profiles may profiles used to provision networks, services, and/or fabrics. The application- and vendor-specific profile group 302 may include a software update profile 306, a locale profile 308, a time profile 310, a sensor profile 312, an access control profile 314, an alarm profile 316, and one or more vendor unique profiles 318. The software update profile 306 may be used by the devices to update software within the devices. The locale profile 308 may be used to specify a location and/or language set as the active locale for the device. The alarm profile 316 may be used to send, read, and propagate alarms.

The profiles library 300 may also include a device control profile 320, a network provisioning profile 322, a fabric provisioning profile 324, and a service provisioning profile 326. The device control profile 320 allows one device to request that another device exercise a specified device control (e.g., arm failsafe, etc.) capability. The network provisioning profile 322 enables a device to be added to a new logical network (e.g., WiFi or 802.15.4). The fabric provisioning profile 324 allows the devices to join a pre-existing fabric or create a new fabric. The service provisioning profile 326 enables the devices to be paired to a service.

The profiles library 300 may also include a strings profile 328, a device description profile 330, a device profile 332, device power extended profile 334, a device power profile 336, a device connectivity extended profile 338, a device connectivity profile 340, a service directory profile 342, a data management profile 344, an echo profile 346, a security profile 348, and a core profile 350. The device description profile 330 may be used by a device to identify one or more other devices. The service directory profile 342 enables a device to communicate with a service. The data management profile 344 enables devices to view and/or track data stored in another device. The echo profile 346 enables a device to determine whether the device is connected to a target device and the latency in the connection. The security profile 348 enables the devices to communicate securely.

The core profile 350 includes a status reporting profile 352 that enables devices to report successes and failures of requested actions. Additionally, in certain embodiments, each device may include a set of methods used to process profiles. For example, a core protocol may include the following profiles: GetProfiles, GetSchema, GetSchemas, GetProperty, GetProperties, SetProperty, SetProperties, RemoveProperty, RemoveProperties, RequestEcho, NotifyPropertyChanged, and/or NotifyPropertiesChanged. The Get Profiles method may return an array of profiles supported by a queried node. The GetSchema and GetSchemas methods may respectively return one or all schemas for a specific profile. GetProperty and GetProperties may respectively return a value or all value pairs for a profile schema. SetProperty and SetProperties may respectively set single or multiple values for a profile schema. RemoveProperty and RemoveProperties may respectively attempt to remove a single or multiple values from a profile schema. RequestEcho may send an arbitrary data payload to a specified node which the node returns unmodified. NotifyPropertyChange and NotifyPropertiesChanged may respectively issue a notification if a single/multiple value pairs have changed for a profile schema.

To aid in understanding profiles and schemas, a non-exclusive list of profiles and schemas are provided below for illustrative purposes.

A. Status Reporting

Figure 17:
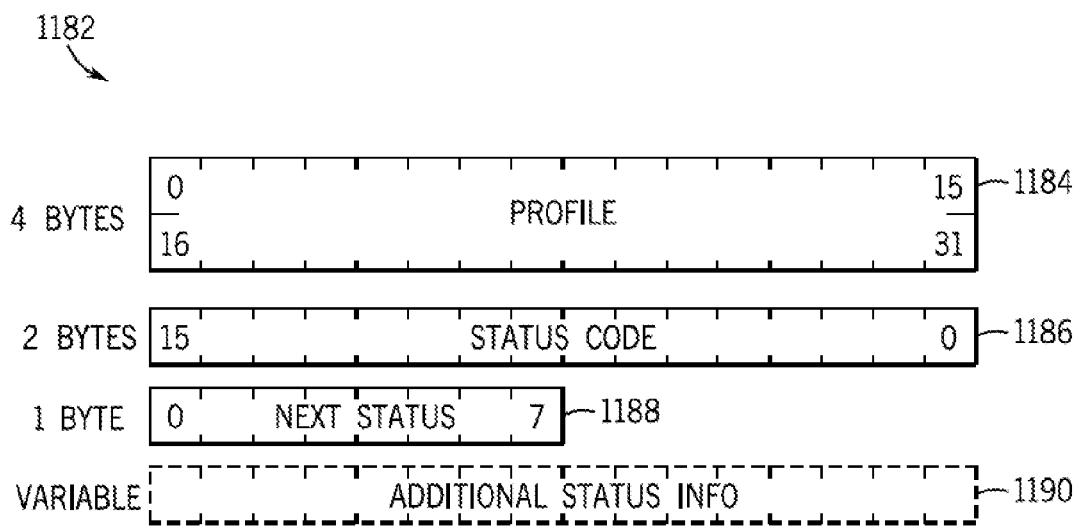
FIG. 17 illustrates a status reporting schema that may be used to update status information in the fabric network, in accordance with an embodiment.

A status reporting schema is presented as the status reporting frame 1182 in FIG. 17. The status reporting schema may be a separate profile or may be included in one or more profiles (e.g., a core profile). In certain embodiments, the status reporting frame 1182 includes a profile field 1184, a status code field 1186, a next status field 1188, and may include an additional status info field 1190.

i. Profile Field

Figure 18:
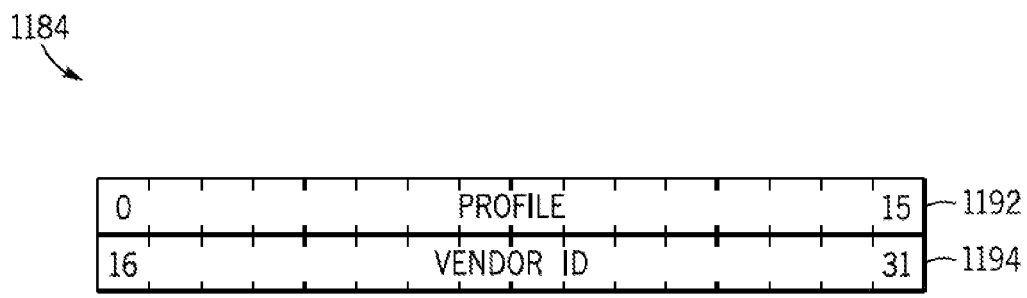
FIG. 18 illustrates a profile field of the status reporting schema of FIG. 17, in accordance with an embodiment.

In some embodiments, the profile field 1184 includes four bytes of data that defines the profile under which the information in the present status report is to be interpreted. An embodiment of the profile field 1184 is illustrated in FIG. 18 with two sub-fields. In the illustrated embodiment, the profile field 1184 includes a profile Id sub-field 1192 that includes sixteen bits that corresponds to a vendor-specific identifier for the profile under which the value of the status code field 1186 is defined. The profile field 1184 may also includes a vendor Id sub-field 1194 that includes sixteen bits that identifies a vendor providing the profile identified in the profile Id sub-field 1192.

ii. Status Code

In certain embodiments, the status code field 1186 includes sixteen bits that encode the status that is being reported. The values in the status code field 1186 are interpreted in relation to values encoded in the vendor Id sub-field 1192 and the profile Id sub-field 1194 provided in the profile field 1184. Additionally, in some embodiments, the status code space may be divided into four groups, as indicated in Table 8 below.

TABLE 8

Status Code Range Table

| Range | Name | Description |
|---|---|---|
| 0x0000 . . . 0x0010 | success | A request was successfully processed. |
| 0x0011 . . . 0x0020 | client error | An error has or may have occurred on the client-side of a client/server exchange. For example, the client has made a badly-formed request. |
| 0x0021 . . . 0x0030 | server error | An error has or may have occurred on the server side of a client/server exchange. For example, the server has failed to process a client request to an operating system error. |
| 0x0031 . . . 0x0040 | continue/ redirect | Additional processing will be used, such as redirection, to complete a particular exchange, but no errors yet. |

Although Table 8 identifies general status code ranges that may be used separately assigned and used for each specific profile Id, in some embodiments, some status codes may be common to each of the profiles. For example, these profiles may be identified using a common profile (e.g., core profile) identifier, such as 0x00000000.

iii. Next Status

In some embodiments, the next status code field 1188 includes eight bits. The next status code field 1188 indicates whether there is following status information after the currently reported status. If following status information is to be included, the next status code field 1188 indicates what type of status information is to be included. In some embodiments, the next status code field 1188 may always be included, thereby potentially increasing the size of the message. However, by providing an opportunity to chain status information together, the potential for overall reduction of data sent may be reduced. If the next status field 1186 is 0x00, no following status information field 1190 is included. However, non-zero values may indicate that data may be included and indicate the form in which the data is included (e.g., in a TLV packet).

iv. Additional Status Info

When the next status code field 1188 is non-zero, the additional status info field 1190 is included in the message. If present, the status item field may contain status in a form that may be determined by the value of the preceding status type field (e.g., TLV format)

B. Software Update

The software update profile or protocol is a set of schemas and a client/server protocol that enables clients to be made aware of or seek information about the presence of software that they may download and install. Using the software update protocol, a software image may be provided to the profile client in a format known to the client. The subsequent processing of the software image may be generic, device-specific, or vendor-specific and determined by the software update protocol and the devices.

i. General Application Headers for the Application Payload

In order to be recognized and handled properly, software update profile frames may be identified within the Application Payload field 1146 of the GMP 1128. In some embodiments, all software update profile frames may use a common Profile Id 1176, such as 0x0000000C. Additionally, software update profile frames may include a Message Type field 1172 that indicates additional information and may chosen according to Table 9 below and the type of message being sent.

TABLE 9

Software update profile message types

| Type | Message |
|---|---|
| 0x00 | image announce |
| 0x01 | image query |
| 0x02 | image query response |
| 0x03 | download notify |
| 0x04 | notify response |
| 0x05 | update notify |
| 0x06 . . . 0xff | reserved |

Additionally, as described below, the software update sequence may be initiated by a server sending the update as an image announce or a client receiving the update as an image query. In either embodiment, an Exchange Id 1174 from the initiating event is used for all messages used in relation to the software update.

ii. Protocol Sequence

Figure 19:
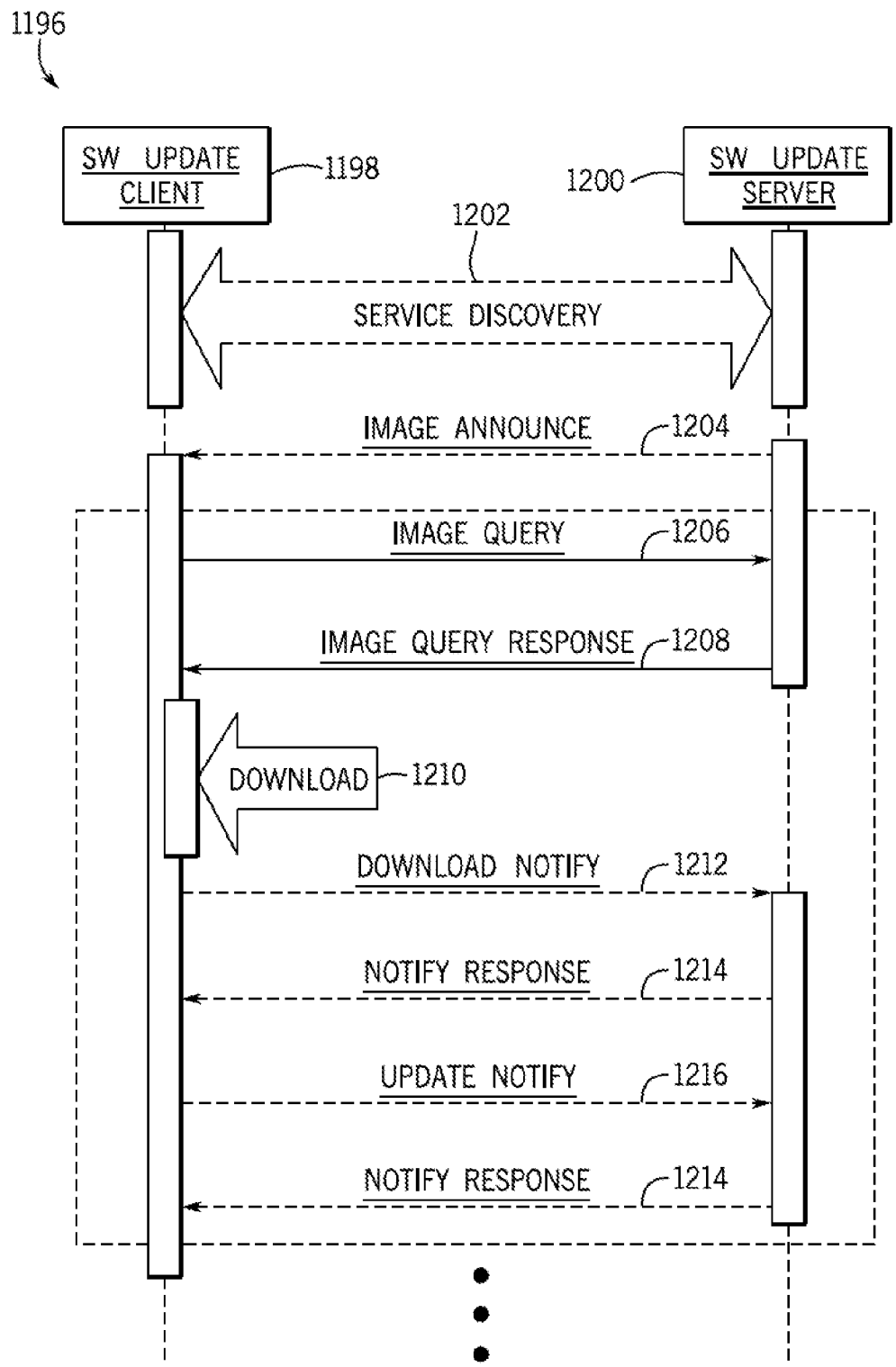
FIG. 19 illustrates a protocol sequence that may be used to perform a software update between a client and a server, in accordance with an embodiment.

FIG. 19 illustrates an embodiment of a protocol sequence 1196 for a software update between a software update client 1198 and a software update server 1200. In certain embodiments, any device in the fabric may be the software update client 1198 or the software update server 1200. Certain embodiments of the protocol sequence 1196 may include additional steps, such as those illustrated as dashed lines that may be omitted in some software update transmissions.

1. Service Discovery

In some embodiments, the protocol sequence 1196 begins with a software update profile server announcing a presence of the update. However, in other embodiments, such as the illustrated embodiment, the protocol sequence 1196 begins with a service discovery 1202, as discussed above.

2. Image Announce

In some embodiments, an image announce message 1204 may be multicast or unicast by the software update server 1200. The image announce message 1204 informs devices in the fabric that the server 1200 has a software update to offer. If the update is applicable to the client 1198, upon receipt of the image announce message 1204, the software update client 1198 responds with an image query message 1206. In certain embodiments, the image announce message 1204 may not be included in the protocol sequence 1196. Instead, in such embodiments, the software update client 1198 may use a polling schedule to determine when to send the image query message 1206.

3. Image Query

Figure 20:
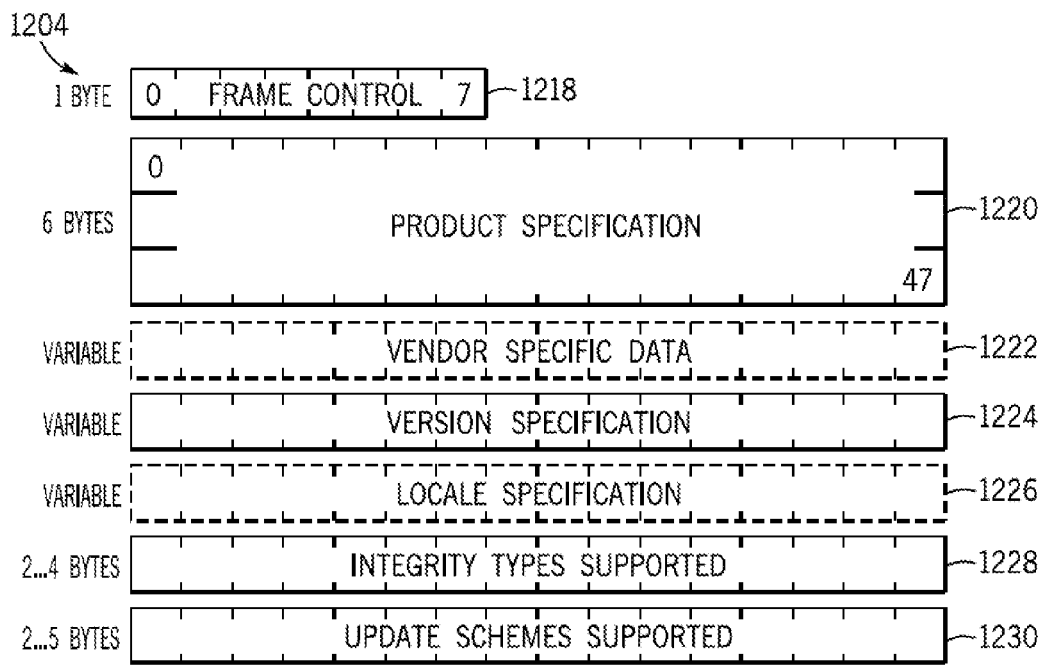
FIG. 20 illustrates an image query frame that may be used in the protocol sequence of FIG. 19, in accordance with an embodiment.

In certain embodiments, the image query message 1206 may be unicast from the software update client 1198 either in response to an image announce message 1204 or according to a polling schedule, as discussed above. The image query message 1206 includes information from the client 1198 about itself. An embodiment of a frame of the image query message 1206 is illustrated in FIG. 20. As illustrated in FIG. 20, certain embodiments of the image query message 1206 may include a frame control field 1218, a product specification field 1220, a vendor specific data field 1222, a version specification field 1224, a locale specification field 1226, an integrity type supported field 1228, and an update schemes supported field 1230.

a. Frame Control

Figure 21:
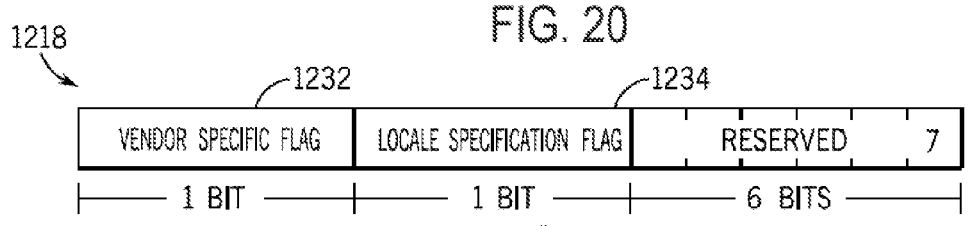
FIG. 21 illustrates a frame control field of the image query frame of FIG. 20, in accordance with an embodiment.

The frame control field 1218 includes 1 byte and indicates various information about the image query message 1204. An example of the frame control field 128 is illustrated in FIG. 21. As illustrated, the frame control field 1218 may include three sub-fields: vendor specific flag 1232, locale specification flag 1234, and a reserved field S3. The vendor specific flag 1232 indicates whether the vendor specific data field 1222 is included in the message image query message. For example, when the vendor specific flag 1232 is 0 no vendor specific data field 1222 may be present in the image query message, but when the vendor specific flag 1232 is 1 the vendor specific data field 1222 may be present in the image query message. Similarly, a 1 value in the locale specification flag 1234 indicates that a locale specification field 1226 is present in the image query message, and a 0 value indicates that the locale specification field 1226 in not present in the image query message.

b. Product Specification

Figure 22:
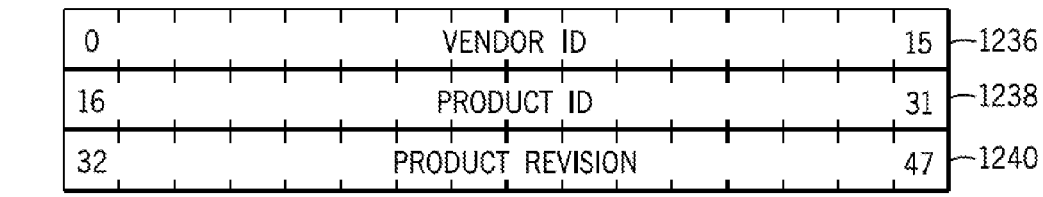
FIG. 22 illustrates a product specification field of the image query frame of FIG. 20, in accordance with an embodiment.

The product specification field 1220 is a six byte field. An embodiment of the product specification field 1220 is illustrated in FIG. 22. As illustrated, the product specification field 1220 may include three sub-fields: a vendor Id field 1236, a product Id field 1238, and a product revision field 1240. The vendor Id field 1236 includes sixteen bits that indicate a vendor for the software update client 1198. The product Id field 1238 includes sixteen bits that indicate the device product that is sending the image query message 1206 as the software update client 1198. The product revision field 1240 includes sixteen bits that indicate a revision attribute of the software update client 1198.

c. Vendor Specific Data

The vendor specific data field 1222, when present in the image query message 1206, has a length of a variable number of bytes. The presence of the vendor specific data field 1222 may be determined from the vendor specific flag 1232 of the frame control field 1218. When present, the vendor specific data field 1222 encodes vendor specific information about the software update client 1198 in a TLV format, as described above.

d. Version Specification

Figure 23:
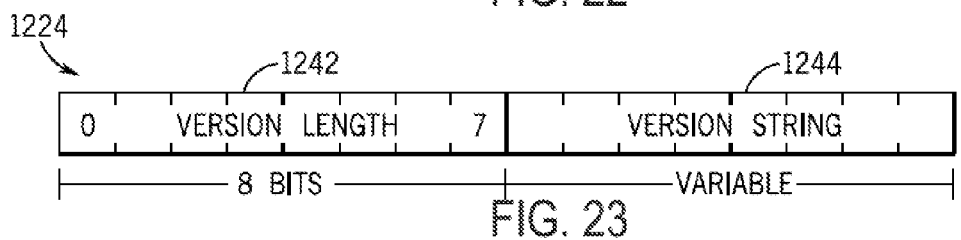
FIG. 23 illustrates a version specification field of the image query frame of FIG. 20, in accordance with an embodiment.

An embodiment of the version specification field 1224 is illustrated in FIG. 23. The version specification field 1224 includes a variable number of bytes sub-divided into two sub-fields: a version length field 1242 and a version string field 1244. The version length field 1242 includes eight bits that indicate a length of the version string field 1244. The version string field 1244 is variable in length and determined by the version length field 1242. In some embodiments, the version string field 1244 may be capped at 255 UTF-8 characters in length. The value encoded in the version string field 1244 indicates a software version attribute for the software update client 1198.

e. Locale Specification

Figure 24:
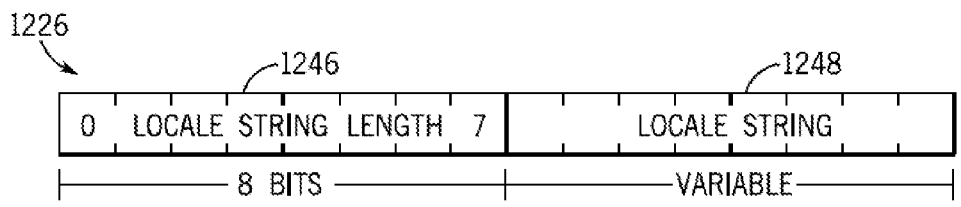
FIG. 24 illustrates a locale specification field of the image query frame of FIG. 20, in accordance with an embodiment.

In certain embodiments, the locale specification field 1226 may be included in the image query message 1206 when the locale specification flag 1234 of the frame control 1218 is 1. An embodiment of the locale specification field 1226 is illustrated in FIG. 24. The illustrated embodiment of the locale specification field 1226 includes a variable number of bytes divided into two sub-fields: a locale string length field 1246 and a locale string field 1248. The locale string length field 1246 includes eight bits that indicate a length of the locale string field 1248. The locale string field 1248 of the locale specification field 1226 may be variable in length and contain a string of UTF-8 characters encoding a local description based on Portable Operating System Interface (POSIX) locale codes. The standard format for POSIX locale codes is [language[_territory][.codeset][@modifier]] For example, the POSIX representation for Australian English is en_AU.UTF8.

f. Integrity Types Supported

Figure 25:
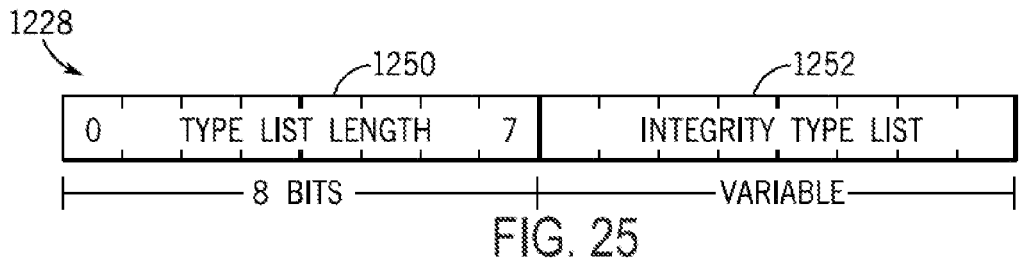
FIG. 25 illustrates an integrity types supported field of the image query frame of FIG. 20, in accordance with an embodiment.

An embodiment of the integrity types field 1228 is illustrated in FIG. 25. The integrity types supported field 1228 includes two to four bytes of data divided into two sub-fields: a type list length field 1250 and an integrity type list field 1252. The type list length field 1250 includes eight bits that indicate the length in bytes of the integrity type list field 1252. The integrity type list field 1252 indicates the value of the software update integrity type attribute of the software update client 1198. In some embodiments, the integrity type may be derived from Table 10 below.

TABLE 10

| Example integrity types | |
|---|---|
| Value | Integrity Type |
| 0x00 | SHA-160 |
| 0x01 | SHA-256 |
| 0x02 | SHA-512 |

The integrity type list field 1252 may contain at least one element from Table 10 or other additional values not included.

g. Update Schemes Supported

Figure 26:
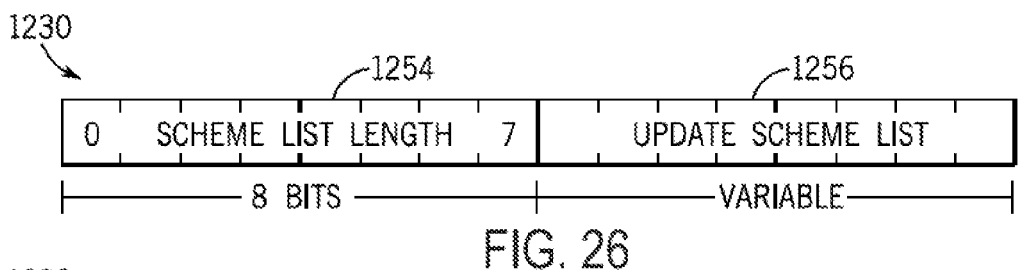
FIG. 26 illustrates an update schemes supported field of the image query frame of FIG. 20, in accordance with an embodiment.

An embodiment of the schemes supported field 1230 is illustrated in FIG. 26. The schemes supported field 1230 includes a variable number of bytes divided into two sub-fields: a scheme list length field 1254 and an update scheme list field 1256. The scheme list length field 1254 includes eight bits that indicate a length of the update scheme list field in bytes. The update scheme list field 1256 of the update schemes supported field 1222 is variable in length determined by the scheme list length field 1254. The update scheme list field 1256 represents an update schemes attributes of the software update profile of the software update client 1198. An embodiment of example values is shown in Table 11 below.

TABLE 11

Example update schemes

| Value | Update Scheme |
|---|---|
| 0x00 | HTTP |
| 0x01 | HTTPS |
| 0x02 | SFTP |
| 0x03 | Fabric-specific File Transfer Protocol (e.g., Bulk Data Transfer discussed below) |

Upon receiving the image query message 1206, the software update server 1200 uses the transmitted information to determine whether the software update server 1200 has an update for the software update client 1198 and how best to deliver the update to the software update client 1198.

4. Image Query Response

Returning to FIG. 19, after the software update server 1200 receives the image query message 1206 from the software update client 1198, the software update server 1200 responds with an image query response 1208. The image query response 1208 includes either information detailing why an update image is not available to the software update client 1198 or information about the available image update to enable to software update client 1198 to download and install the update.

Figure 27:
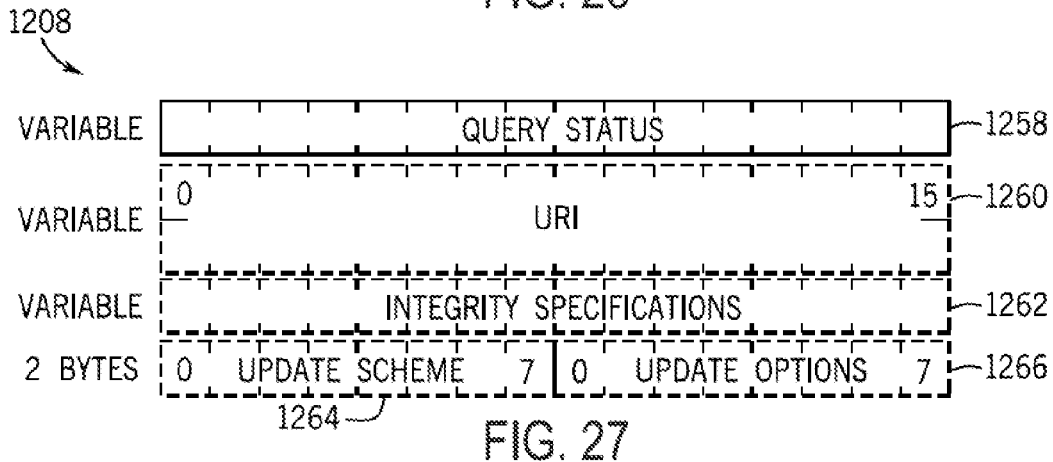
FIG. 27 illustrates an image query response frame that may be used in the protocol sequence of FIG. 19, in accordance with an embodiment.

An embodiment of a frame of the image query response 1208 is illustrated in FIG. 27. As illustrated, the image query response 1208 includes five possible sub-fields: a query status field 1258, a uniform resource identifier (URI) field 1260, an integrity specification field 1262, an update scheme field 1264, and an update options field 1266.

a. Query Status

The query status field 1258 includes a variable number of bytes and contains status reporting formatted data, as discussed above in reference to status reporting. For example, the query status field 1258 may include image query response status codes, such as those illustrated below in Table 12.

TABLE 12

Example image query response status codes

| Profile | Code | Description |
|---|---|---|
| 0x00000000 | 0x0000 | The server has processed the image query message 1206 and has an update for the software update client 1198. |
| 0x0000000C | 0x0001 | The server has processed the image query message 1206, but the server does not have an update for the software update client 1198. |
| 0x00000000 | 0x0010 | The server could not process the request because of improper form for the request. |
| 0x00000000 | 0x0020 | The server could not process the request due to an internal error | b. URI

Figure 28:
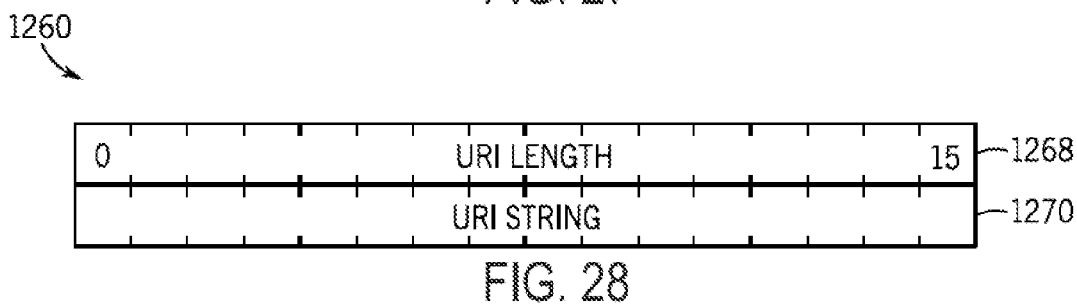
FIG. 28 illustrates a uniform resource identifier (URI) field of the image query response frame of FIG. 27, in accordance with an embodiment.

The URI field 1260 includes a variable number of bytes. The presence of the URI field 1260 may be determined by the query status field 1258. If the query status field 1258 indicates that an update is available, the URI field 1260 may be included. An embodiment of the URI field 1260 is illustrated in FIG. 28. The URI field 1260 includes two sub-fields: a URI length field 1268 and a URI string field 1270. The URI length field 1268 includes sixteen bits that indicates the length of the URI string field 1270 in UTF-8 characters. The URI string field 1270 and indicates the URI attribute of the software image update being presented, such that the software update client 1198 may be able to locate, download, and install a software image update, when present.

c. Integrity Specification

Figure 29:
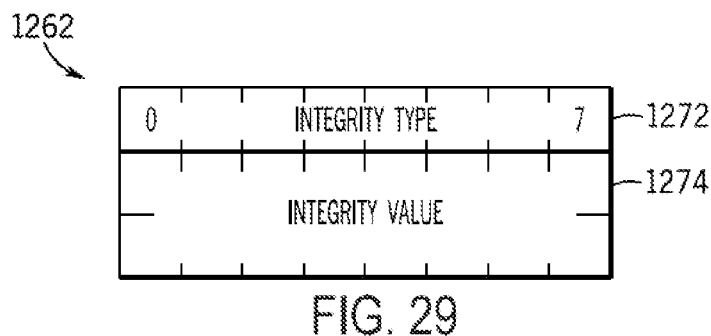
FIG. 29 illustrates a integrity specification field of the image query response frame of FIG. 27, in accordance with an embodiment.

The integrity specification field 1262 may variable in length and present when the query status field 1258 indicates that an update is available from the software update server 1198 to the software update client 1198. An embodiment of the integrity specification field 1262 is illustrated in FIG. 29. As illustrated, the integrity specification field 1262 includes two sub-fields: an integrity type field 1272 and an integrity value field 1274. The integrity type field 1272 includes eight bits that indicates an integrity type attribute for the software image update and may be populated using a list similar to that illustrated in Table 10 above. The integrity value field 1274 includes the integrity value that is used to verify that the image update message has maintained integrity during the transmission.

d. Update Scheme

The update scheme field 1264 includes eight bits and is present when the query status field 1258 indicates that an update is available from the software update server 1198 to the software update client 1198. If present, the update scheme field 1264 indicates a scheme attribute for the software update image being presented to the software update server 1198.

e. Update Options

Figure 30:
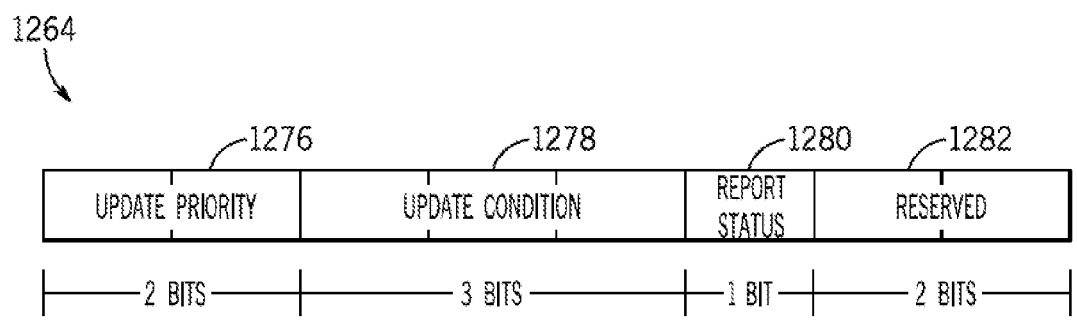
FIG. 30 illustrates an update scheme field of the image query response frame of FIG. 27, in accordance with an embodiment.

The update options field 1266 includes eight bits and is present when the query status field 1258 indicates that an update is available from the software update server 1198 to the software update client 1198. The update options field 1266 may be sub-divided as illustrated in FIG. 30. As illustrated, the update options field 1266 includes four sub-fields: an update priority field 1276, an update condition field 1278, a report status flag 1280, and a reserved field 1282. In some embodiments, the update priority field 1276 includes two bits. The update priority field 1276 indicates a priority attribute of the update and may be determined using values such as those illustrated in Table 13 below.

TABLE 13

Example update priority values

| Value | Description |
|---|---|
| 00 | Normal - update during a period of low network traffic |
| 01 | Critical - update as quickly as possible |

The update condition field 1278 includes three bits that may be used to determine conditional factors to determine when or if to update. For example, values in the update condition field 1278 may be decoded using the Table 14 below.

TABLE 14

Example update conditions

| Value | Decryption |
|---|---|
| 0 | Update without conditions |
| 1 | Update if the version of the software running on the update client software does not match the update version. |
| 2 | Update if the version of the software running on the update client software is older than the update version. |
| 3 | Update if the user opts into an update with a user interface |

The report status flag 1280 is a single bit that indicates whether the software update client 1198 should respond with a download notify message 1210. If the report status flag 1280 is set to 1 the software update server 1198 is requesting a download notify message 1210 to be sent after the software update is downloaded by the software update client 1200.

If the image query response 1208 indicates that an update is available. The software update client 1198 downloads 1210 the update using the information included in the image query response 1208 at a time indicated in the image query response 1208.

5. Download Notify

After the update download 1210 is successfully completed or failed and the report status flag 1280 value is 1, the software update client 1198 may respond with the download notify message 1212. The download notify message 1210 may be formatted in accordance with the status reporting format discussed above. An example of status codes used in the download notify message 1212 is illustrated in Table 15 below.

TABLE 15

Example download notify status codes

| Profile | Code | Description |
|---|---|---|
| 0x00000000 | 0x0000 | The download has been completed, and integrity verified |
| 0x0000000C | 0x0020 | The download could not be completed due to faulty download instructions. |
| 0x0000000C | 0x0021 | The image query response message 1208 appears proper, but the download or integrity verification failed. |
| 0x0000000C | 0x0022 | The integrity of the download could not be verified. |

In addition to the status reporting described above, the download notify message 1208 may include additional status information that may be relevant to the download and/or failure to download.

6. Notify Response

The software update server 1200 may respond with a notify response message 1214 in response to the download notify message 1212 or an update notify message 1216. The notify response message 1214 may include the status reporting format, as described above. For example, the notify response message 1214 may include status codes as enumerated in Table 16 below.

TABLE 16

Example notify response status codes

| Profile | Code | Description |
|---|---|---|
| 0x00000000 | 0x0030 | Continue - the notification is acknowledged, but the update has not completed, such as download notify message 1214 received but update notify message 1216 has not. |
| 0x00000000 | 0x0000 | Success - the notification is acknowledged, and the update has completed. |
| 0x0000000C | 0x0023 | Abort - the notification is acknowledged, but the server cannot continue the update. |
| 0x0000000C | 0x0031 | Retry query - the notification is acknowledged, and the software update client 1198 is directed to retry the update by submitting another image query message 1206. |

In addition to the status reporting described above, the notify response message 1214 may include additional status information that may be relevant to the download, update, and/or failure to download/update the software update.

7. Update Notify

After the update is successfully completed or failed and the report status flag 1280 value is 1, the software update client 1198 may respond with the update notify message 1216. The update notify message 1216 may use the status reporting format described above. For example, the update notify message 1216 may include status codes as enumerated in Table 17 below.

TABLE 17

Example update notify status codes

| Profile | Code | Description |
|---|---|---|
| 0x00000000 | 0x0000 | Success - the update has been completed. |
| 0x0000000C | 0x0010 | Client error - the update failed due to a problem in the software update client 1198. |

In addition to the status reporting described above, the update notify message 1216 may include additional status information that may be relevant to the update and/or failure to update.

C. Bulk Transfer

In some embodiments, it may be desirable to transfer bulk data files (e.g., sensor data, logs, or update images) between nodes/services in the fabric 1000. To enable transfer of bulk data, a separate profile or protocol may be incorporated into one or more profiles and made available to the nodes/services in the nodes. The bulk data transfer protocol may model data files as collections of data with metadata attachments. In certain embodiments, the data may be opaque, but the metadata may be used to determine whether to proceed with a requested file transfer.

Figure 31:
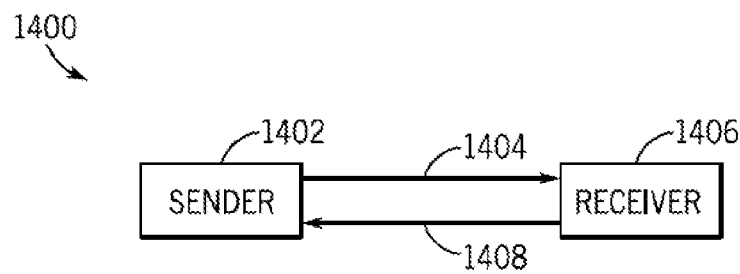
FIG. 31 illustrates a communicative connection between a sender and a receiver in a bulk data transfer, in accordance with an embodiment.

Devices participating in a bulk transfer may be generally divided according to the bulk transfer communication and event creation. As illustrated in FIG. 31, each communication 1400 in a bulk transfer includes a sender 1402 that is a node/service that sends the bulk data 1404 to a receiver 1406 that is a node/service that receives the bulk data 1404. In some embodiments, the receiver may send status information 1408 to the sender 1402 indicating a status of the bulk transfer.

Additionally, a bulk transfer event may be initiated by either the sender 1402 (e.g., upload) or the receiver 1406 (e.g., download) as the initiator. A node/service that responds to the initiator may be referred to as the responder in the bulk data transfer.

Bulk data transfer may occur using either synchronous or asynchronous modes. The mode in which the data is transferred may be determined using a variety of factors, such as the underlying protocol (e.g., UDP or TCP) on which the bulk data is sent. In connectionless protocols (e.g., UDP), bulk data may be transferred using a synchronous mode that allows one of the nodes/services ("the driver") to control a rate at which the transfer proceeds. In certain embodiments, after each message in a synchronous mode bulk data transfer, an acknowledgment may be sent before sending the next message in the bulk data transfer. The driver may be the sender 1402 or the receiver 1406. In some embodiments, the driver may toggle between an online state and an offline mode while sending messages to advance the transfer when in the online state. In bulk data transfers using connection-oriented protocols (e.g., TCP), bulk data may be transferred using an asynchronous mode that does not use an acknowledgment before sending successive messages or a single driver.

Regardless of whether the bulk data transfer is performed using a synchronous or asynchronous mode, a type of message may be determined using a Message Type 1172 in the Application Payload 1146 according the Profile Id 1176 in the Application Payload. Table 18 includes an example of message types that may be used in relation to a bulk data transfer profile value in the Profile Id 1176.

TABLE 18

Examples of message types for bulk data transfer profiles

| Message Type | Message |
|---|---|
| 0x01 | SendInit |
| 0x02 | SendAccept |
| 0x03 | SendReject |
| 0x04 | ReceiveInit |
| 0x05 | ReceiveAccept |
| 0x06 | ReceiveReject |
| 0x07 | BlockQuery |
| 0x08 | Block |
| 0x09 | BlockEOF |
| 0x0A | Ack |
| 0x0B | Block EOF |
| 0x0C | Error | i. SendInit

Figure 32:
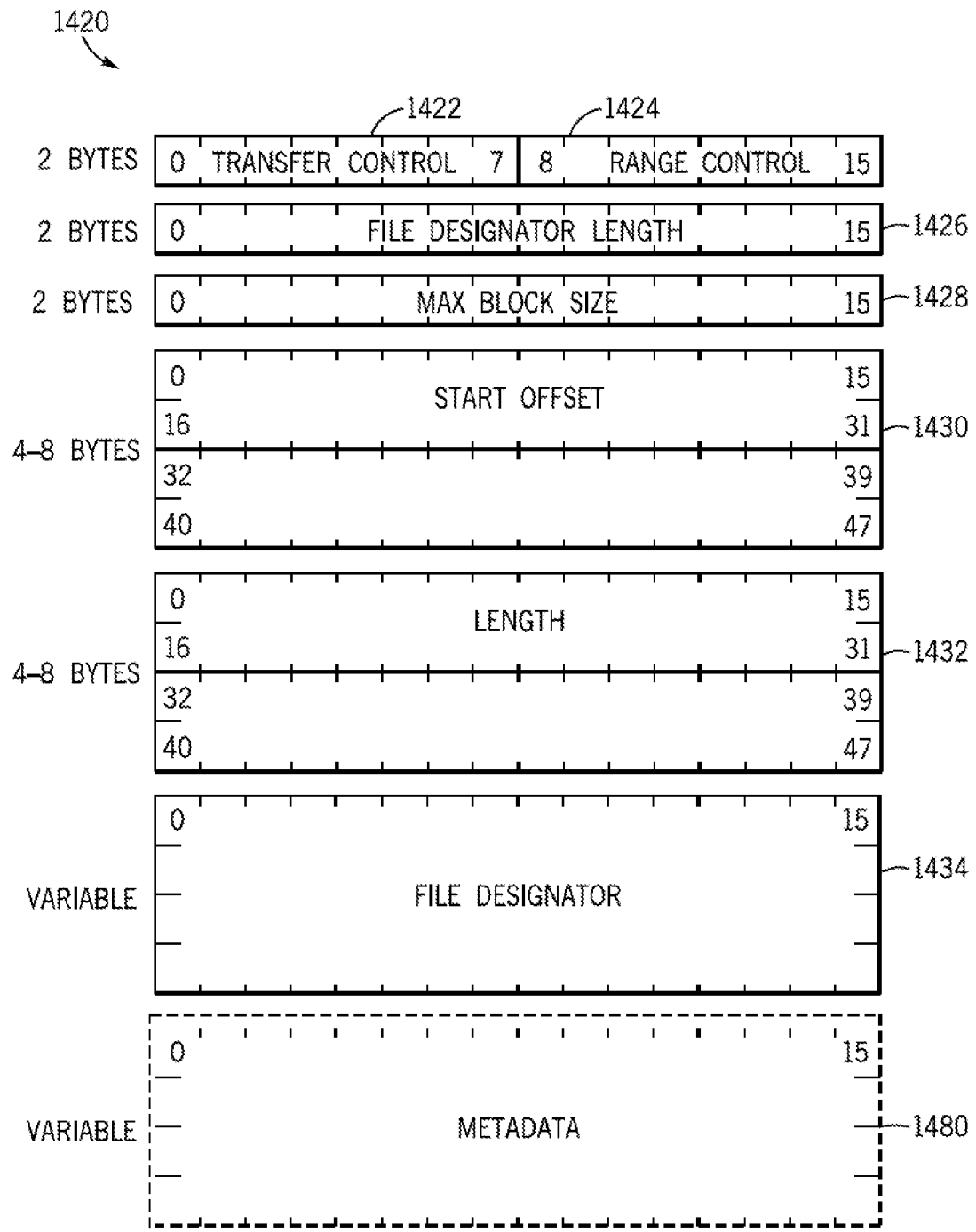
FIG. 32 illustrates a SendInit message that may be used to initiate the communicative connection by the sender of FIG. 31, in accordance with an embodiment.

An embodiment of a SendInit message 1420 is illustrated in FIG. 32. The SendInit message 1420 may include seven fields: a transfer control field 1422, a range control field 1424, a file designator length field 1426, a proposed max block size field 1428, a start offset field 1430, length field 1432, and a file designator field 1434.

Figure 33:
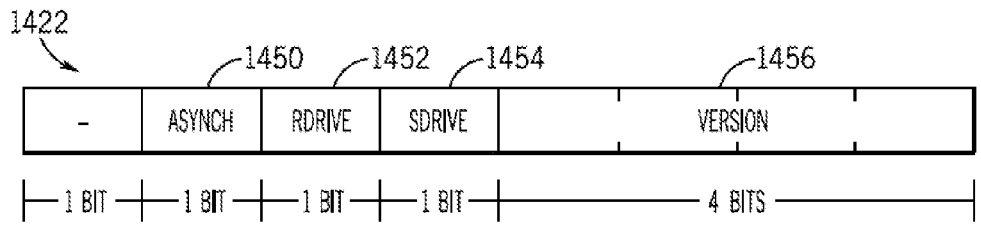
FIG. 33 illustrates a transfer control field of the SendInit message of FIG. 32, in accordance with an embodiment.

The transfer control field 1422 includes a byte of data illustrated in FIG. 33. The transfer control field includes at least four fields: an Asynch flag 1450, an RDrive flag 1452, an SDrive flag 1454, and a version field 1456. The Asynch flag 1450 indicates whether the proposed transfer may be performed using a synchronous or an asynchronous mode. The RDrive flag 1452 and the SDrive flag 1454 each respectively indicates whether the receiver 1406 is capable of transferring data with the receiver 1402 or the sender 1408 driving a synchronous mode transfer.

Figure 34:
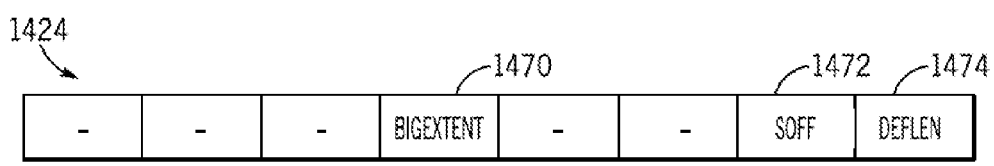
FIG. 34 illustrates a range control field of the SendInit message of FIG. 33, in accordance with an embodiment.

The range control field 1424 includes a byte of data such as the range control field 1424 illustrated in FIG. 34. In the illustrated embodiment, the range control field 1424 includes at least three fields: a BigExtent flag 1470, a start offset flag 1472, and a definite length flag 1474. The definite length flag 1474 indicates whether the transfer has a definite length. The definite length flag 1474 indicates whether the length field 1432 is present in the SendInit message 1420, and the BigExtent flag 1470 indicates a size for the length field 1432. For example, in some embodiments, a value of 1 in the BigExtent flag 1470 indicates that the length field 1432 is eight bytes. Otherwise, the length field 1432 is four bytes, when present. If the transfer has a definite length, the start offset flag 1472 indicates whether a start offset is present. If a start offset is present, the BigExtent flag 1470 indicates a length for the start offset field 1430. For example, in some embodiments, a value of 1 in the BigExtent flag 1470 indicates that the start offset field 1430 is eight bytes. Otherwise, the start offset field 1430 is four bytes, when present.

Returning to FIG. 32, the file designator length field 1426 includes two bytes that indicate a length of the file designator field 1434. The file designator field 1434 which is a variable length field dependent upon the file designator length field 1426. The max block size field 1428 proposes a maximum size of block that may be transferred in a single transfer.

The start offset field 1430, when present, has a length indicated by the BigExtent flag 1470. The value of the start offset field 1430 indicates a location within the file to be transferred from which the sender 1402 may start the transfer, essentially allowing large file transfers to be segmented into multiple bulk transfer sessions.

The length field 1432, when present, indicates a length of the file to be transferred if the definite length field 1474 indicates that the file has a definite length. In some embodiments, if the receiver 1402 receives a final block before the length is achieved, the receiver may consider the transfer failed and report an error as discussed below.

The file designator field 1434 is a variable length identifier chosen by the sender 1402 to identify the file to be sent. In some embodiments, the sender 1402 and the receiver 1406 may negotiate the identifier for the file prior to transmittal. In other embodiments, the receiver 1406 may use metadata along with the file designator field 1434 to determine whether to accept the transfer and how to handle the data. The length of the file designator field 1434 may be determined from the file designator length field 1426. In some embodiments, the SendInit message 1420 may also include a metadata field 1480 of a variable length encoded in a TLV format. The metadata field 1480 enables the initiator to send additional information, such as application-specific information about the file to be transferred. In some embodiments, the metadata field 1480 may be used to avoid negotiating the file designator field 1434 prior to the bulk data transfer.

ii. SendAccept

Figure 35:
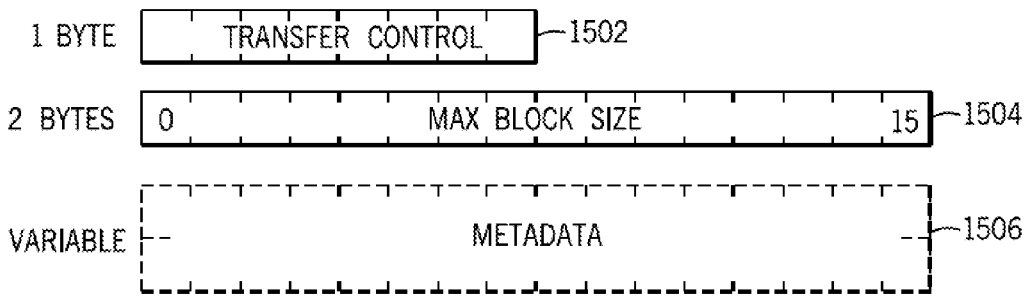
FIG. 35 illustrates a SendAccept message that may be used to accept a communicative connection proposed by the SendInit message of FIG. 32 sent by the sender of FIG. 32, in accordance with an embodiment.

A send accept message is transmitted from the responder to indicate the transfer mode chosen for the transfer. An embodiment of a SendAccept message 1500 is presented in FIG. 35. The SendAccept message 1500 includes a transfer control field 1502 similar to the transfer control field 1422 of the SendInit message 1420. However, in some embodiments, only the RDrive flag 1452 or the SDrive 1454 may have a nonzero value in the transfer control field 1502 to identify the sender 1402 or the receiver 1406 as the driver of a synchronous mode transfer. The SendAccept message 1500 also includes a max block size field 1504 that indicates a maximum block size for the transfer. The block size field 1504 may be equal to the value of the max block field 1428 of the SendInit message 1420, but the value of the max block size field 1504 may be smaller than the value proposed in the max block field 1428. Finally, the SendAccept message 1500 may include a metadata field 1506 that indicates information that the receiver 1506 may pass to the sender 1402 about the transfer.

iii. SendReject

Figure 36:
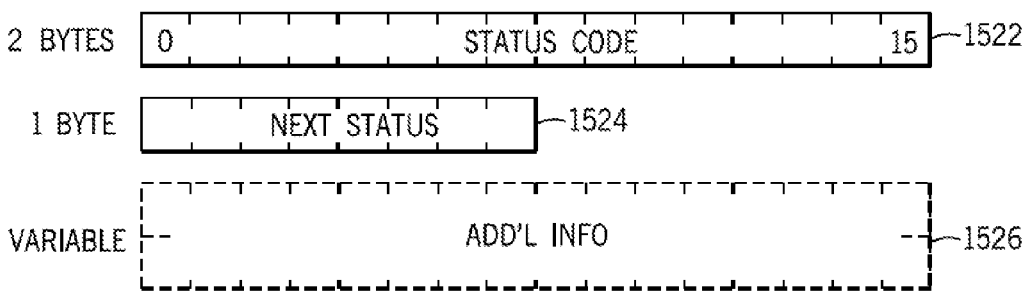
FIG. 36 illustrates a SendReject message that may be used to reject a communicative connection proposed by the SendInit message of FIG. 32 sent by the sender of FIG. 32, in accordance with an embodiment.

When the receiver 1206 rejects a transfer after a SendInit message, the receiver 1206 may send a SendReject message that indicates that one or more issues exist regarding the bulk data transfer between the sender 1202 and the receiver 1206. The send reject message may be formatted according to the status reporting format described above and illustrated in FIG. 36. A send reject frame 1520 may include a status code field 1522 that includes two bytes that indicate a reason for rejecting the transfer. The status code field 1522 may be decoded using values similar to those enumerated as indicated in the Table 19 below.

TABLE 19

Example status codes for send reject message

| Status Code | Description |
| --- | --- |
| 0x0020 | Transfer method not supported |
| 0x0021 | File designator unknown |
| 0x0022 | Start offset not supported |
| 0x0011 | Length required |
| 0x0012 | Length too large |
| 0x002F | Unknown error |

In some embodiments, the send reject message 1520 may include a next status field 1524. The next status field 1524, when present, may be formatted and encoded as discussed above in regard to the next status field 1188 of a status report frame. In certain embodiments, the send reject message 1520 may include an additional information field 1526. The additional information field 1526, when present, may store information about an additional status and may be encoded using the TLV format discussed above.

iv. ReceiveInit

A ReceiveInit message may be transmitted by the receiver 1206 as the initiator. The ReceiveInit message may be formatted and encoded similar to the SendInit message 1480 illustrated in FIG. 32, but the BigExtent field 1470 may be referred to as a maximum length field that specifies the maximum file size that the receiver 1206 can handle.

v. ReceiveAccept

Figure 37:
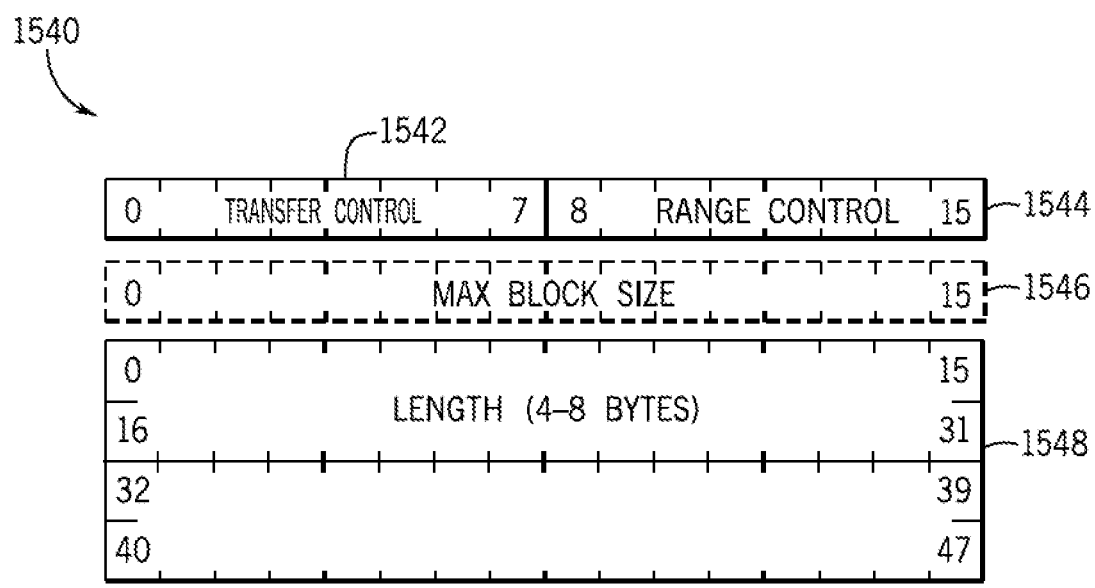
FIG. 37 illustrates a ReceiveAccept message that may be used to accept a communicative connection proposed by the receiver of FIG. 32, in accordance with an embodiment.

When the sender 1202 receives a ReceiveInit message, the sender 1202 may respond with a ReceiveAccept message. The ReceiveAccept message may be formatted and encoded as the ReceiveAccept message 1540 illustrated in FIG. 37. The ReceiveAccept message 1540 may include four fields: a transfer control field 1542, a range control field 1544, a max block size field 1546, and sometimes a length field 1548. The ReceiveAccept message 1540 may be formatted similar to the SendAccept message 1502 of FIG. 35 with the second byte indicating the range control field 1544. Furthermore, the range control field 1544 may be formatted and encoded using the same methods discussed above regarding the range control field 1424 of FIG. 34.

vi. ReceiveReject

If the sender 1202 encounters an issue with transferring the file to the receiver 1206, the sender 1202 may send a ReceiveReject message formatted and encoded similar to a SendReject message 48 using the status reporting format, both discussed above. However, the status code field 1522 may be encoded/decoded using values similar to those enumerated as indicated in the Table 20 below.

TABLE 20

Example status codes for receive reject message

| Status Code | Description |
| --- | --- |
| 0x0020 | Transfer method not supported |
| 0x0021 | File designator unknown |
| 0x0022 | Start offset not supported |
| 0x0013 | Length too short |
| 0x002F | Unknown error | vii. BlockQuery

A BlockQuery message may be sent by a driving receiver 1202 in a synchronous mode bulk data transfer to request the next block of data. A BlockQuery impliedly acknowledges receipt of a previous block of data if not explicit Acknowledgement has been sent. In embodiments using asynchronous transfers, a BlockQuery message may be omitted from the transmission process.

viii. Block

Blocks of data transmitted in a bulk data transfer may include any length greater than 0 and less than a max block size agreed upon by the sender 1202 and the receiver 1206.

ix. BlockEOF

A final block in a data transfer may be presented as a Block end of file (BlockEOF). The BlockEOF may have a length between 0 and the max block size. If the receiver 1206 finds a discrepancy between a pre-negotiated file size (e.g., length field 1432) and the amount of data actually transferred, the receiver 1206 may send an Error message indicating the failure, as discussed below.

x. Ack

If the sender 1202 is driving a synchronous mode transfer, the sender 1202 may wait until receiving an acknowledgment (Ack) after sending a Block before sending the next Block. If the receiver is driving a synchronous mode transfer, the receiver 1206 may send either an explicit Ack or a BlockQuery to acknowledge receipt of the previous block. Furthermore, in asynchronous mode bulk transfers, the Ack message may be omitted from the transmission process altogether.

xi. AckEOF

An acknowledgement of an end of file (AckEOF) may be sent in bulk transfers sent in synchronous mode or asynchronous mode. Using the AckEOF the receiver 1206 indicates that all data in the transfer has been received and signals the end of the bulk data transfer session.

xii. Error

In the occurrence of certain issues in the communication, the sender 1202 or the receiver 1206 may send an error message to prematurely end the bulk data transfer session. Error messages may be formatted and encoded according to the status reporting format discussed above. For example, an error message may be formatted similar to the SendReject frame 1520 of FIG. 36. However, the status codes may be encoded/decoded with values including and/or similar to those enumerated in Table 21 below.

TABLE 21

Example status codes for an error message in a bulk data transfer profile

| Status code | Description |
| --- | --- |
| 0x001F | Transfer failed unknown error |
| 0x0011 | Overflow error |

D. Locale Profile

Using the locale profile, smart devices may present supported localizations to other devices in the mesh network. Specifically, the locale profile enables smart devices to specify which locations and languages are supported in a specific format recognizable by other devices in the network.

In some embodiments, any communication using the locale profile may be identified using a profile ID. For example, in some embodiments, the profile ID for the locale profile may be 0x0000 0011. Any communication tagged with the locale profile ID may be interpreted as a locale identifier organized in a format that is mutually understood by other devices in the network. Moreover, in some embodiments, the bits of data in the profile may be formatted in a big endian or little endian. Furthermore, in some embodiments, the locale profile may be instanced for each device using a node identifier as a unique identifier for each respective device in the network.

a. Locale Profile Schema

Figure 38:
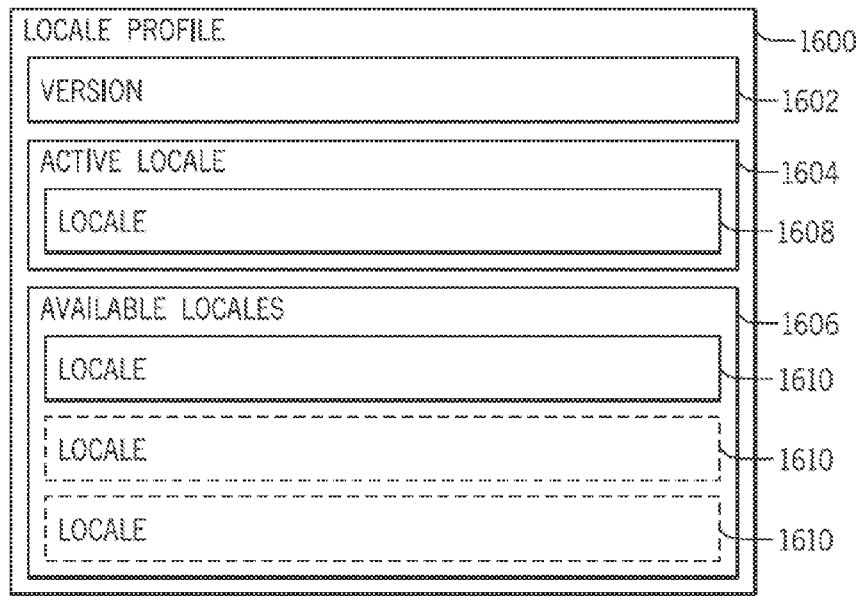
FIG. 38 illustrates a locale profile data structure that may be employed to implement a locale profile, in accordance with an embodiment.

FIG. 38 illustrates a schema 1600 for the locale profile, according to an embodiment. The schema 1600 includes three fields: a version field 1602, an active locale field 1604, and an available locale field 1606. The version field 1602 includes an indication of which version of the schema is being currently employed. Thus, in some embodiments, the devices on the network may be able to use future-designed schema and/or to encode/decode the data in the currently-used version of the schema when there are multiple versions of the schema. Table 22 illustrates an example of a format that may be used to represent the version field 1602.

TABLE 22

Example formatting for the schema version element

| Name | Tag Number | Element Type | Constraints | Readability | Writability |
|---|---|---|---|---|---|
| Schema Version | 0x0002 | Unsigned Integer | 0-255 | Any | — |

The schema version field 1602 may include a profile-specific tag number (e.g., 0x0002) that allows a receiving device to determine that the version field 1602 is being sent. In some embodiments, this tag may be formatted according to the locale profile or another profile (e.g., core profile) that enables receiving data to interpret the tag. Furthermore, in some embodiments, the data following the schema version tag may be an unsigned integer that indicates the version. In some embodiments, the unsigned integer may be limited to a number of values (e.g., 0-255). For example, the integer may be limited by an amount of bits allocated to the schema version field 1602. In other embodiments, the number may be constrained beyond the integers that may be represented using the available bits. Furthermore, in some embodiments, the schema version field 1602 may be read by other devices in the network using the locale profile. Furthermore, in some embodiments, the other devices may write to the schema version using another profile (e.g., software update profile, etc.). In some embodiments, at least some of the devices in the network are not able to write the schema version field.

The schema version 1602 value may be largely advisory in nature and intended to signal to schema readers a change in the schema from this specification. In some embodiments, when changes to the schema are additive, the schema number is simply advisory to the schema reader that new top-level schema fields are present. In such embodiments, normal schema lookup or iteration would make these new fields known without a reliance on this particular field or value. However, a schema change coupled with a change in this field value helps software validation checks confirm that these additions are intended and not simply implementation errors.

The active locale field 1604 includes an active locale sub-field 1608 that indicates which locale is active for the device. In other words, the active locale field 1604 may indicate which language and/or location is being used by the device. For example, the device may display a user interface based on the selected location and/or language. The available locales field 1606 includes one or more available locales sub-fields 1610. Each available locale sub-field 1610 indicates an available locale that is supported and understood by the device.

i. Locale Sub-Fields Representation

The following Table 23 represents formatting that may be used to represent the active locale sub-field 1608 and/or the available locale sub-fields 1610.

TABLE 23

Example formatting for the active and available locale elements

| Name | Tag Number | Element Type | Constraints | Readability | Writability |
|---|---|---|---|---|---|
| Active Locale | 0x0001 | UTF-8 String | IETF BCP 47 Formatted | Any | Any |
| Available Locale | 0x0002 | UTF-8 String | IETF BCP 47 Formatted | Any | — |

Each of the sub-fields 1608 and 1610 include respective tag numbers used to identify the tagged information as the active locale sub-field 1608 or an available locale sub-field 1610. In some embodiments, the tagged data may be formatted in a specific format (e.g., Universal Character Set and Transformation Format-8 bit). Furthermore, in certain embodiments, the tagged data may have further constraints. For example, in some embodiments, the tagged data may include strings of data formatted according to the Internet Engineering Task Force (IETF) Best Current Practices (BCP) 47 specification.

b. Retrieving and Setting Locales

Figure 39:
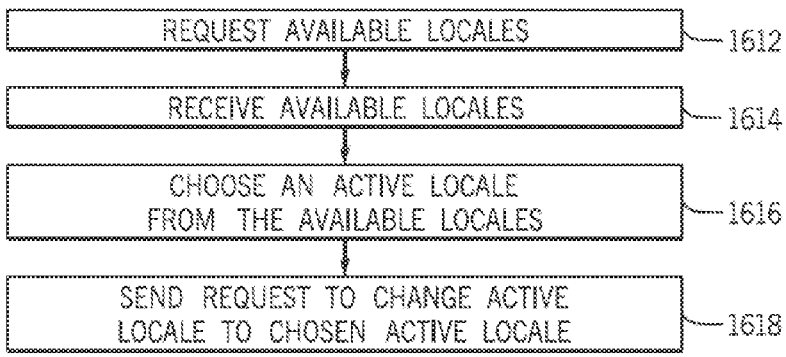
FIG. 39 illustrates a method for setting an active locale using the locale profile, in accordance with an embodiment.

FIG. 39 illustrates a process used by a device on the network to request available locales and set an active locale for another device on the network. The requesting device requests that another device send a list of available locales that are available to the other device (block 1612) In some embodiments, the requesting device may use a data management view request, such as those disclosed in U.S. Provisional Application No. 62/061,593, filed Oct. 8, 2014, and entitled "FABRIC NETWORK." In certain embodiments, the requesting device may request a view of the entire profile instance of the locale profile on the other device. In other embodiments, the requesting device may request a view of only the available locales sub-fields 1610 of the profile instance. The requesting device then receives the available locales sub-fields 1610 (block 1614). In embodiments where the requesting device has requested the entire profile instance, the requesting device may iterate over the list of available locales with or without the additional information in the profile instance. In embodiments where the requesting device has only requested the available locales sub-fields 1610, the requesting device may iterate over all received data.

Upon receiving the available locales, the requesting device may select an active profile form the available profiles (block 1616). In some embodiments, the requesting device may present the available locales to a user and receive a selection from a user. In certain embodiments, the requesting device may select the active profile to a preferred locale that may be stored on the requesting device, another device, and/or the service. In some embodiments, the preferred locale may be a locale atop a list of available locale. In other words, one or more locales may be prioritized into a list with the requesting device selecting the highest priority locale available to the other device. After selecting a new active profile, the requesting device sends a request to change the active locale to the selected locale (block 1618).

In some embodiments, the requesting device may store the available locales for a device without setting a new active profile. For example, a user wishing to see available locales (or a set active profile) for another device may be physically located at the requesting device without changing the active profile. In such embodiments, the requesting device may not choose and active profile or send a request to change the active profile.

Figure 40:
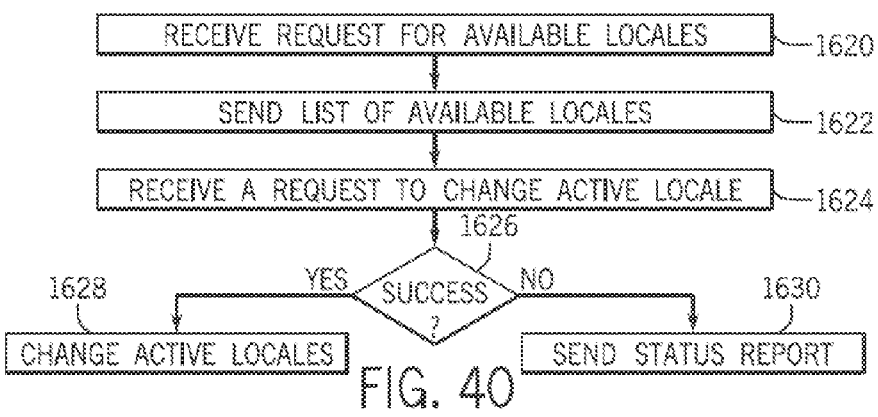
FIG. 40 illustrates a method for receiving an indication of an active locale using the locale profile, in accordance with an embodiment.

FIG. 40 illustrates a process that may be performed by the device upon which the locale is to be set. The device receives a request from a requesting device on the same smart network as the device (block 1620). The request asks for information related to the locales available to the device. For example, the request may include a data management view request, such as those disclosed in U.S. Provisional Application No. 62/061,593, filed Oct. 8, 2014, and entitled "FABRIC NETWORK." As previously discussed, the request may also include a request for an entire locale profile instance or may only request the available locales sub-fields 1610 of the profile instance. The device responds with the available locales sub-fields 1610 with or without the rest of the profile instance (block 1622). In some embodiments, the device subsequently receives a request to change the active locale (block 1624). The device determines whether a properly formatted request pertains to an available locale (block 1626). If the request is successful, the device changes its active locale to the requested locale (block 1628). However, if the request is not successful, the device response with a failure status report (block 1630). For example, if the request is formatted incorrectly or refers to a locale unsupported by the device, the device responds with a relevant status report. For example, the device may respond using a status report of the core profile. Table 24 illustrates a couple example status codes that may be used in reporting failure of a set active locale request.

TABLE 24

Example locale profile status codes

| Status | Code | Description |
| --- | --- | --- |
| Locale Not Supported or Unknown | 0x0001 | The requested locale is not supported or is unknown to the device. |
| Locale Improperly Formatted | 0x0002 | The requested locale is not a properly IETF BCP 47-formatted locale. |

Herebelow is an example of the process for setting an active locale. The requesting device requests all available locales. The responding device responds with British English, United States English, United States Spanish, Canadian French, and Netherlands Dutch among one or more other similar locales. The requesting device sets the active profile to United States English. Table 25 below illustrates an example encoding of these communications.

TABLE 25

A Locale Profile data schema example.

| Element | Human Readable Value | Tag | Length | Value |
| --- | --- | --- | --- | --- |
| Schema Version | 1 | 0xC4 00 00 00 00 00 02 | 0x01 | 0x01 |
| Active Locale | "en_US" | 0xCC 00 00 00 11 00 01 | 0x05 | 0x65 6e 5f 55 53 |
| Available Locales | "en_GB" "en_US" "es_US" "fr_CA" "nl_NL" | 0xD6 00 00 00 11 00 02 | — | 0x0C 05 65 6e 5f 47 42 0C 05 65 6e 5f 55 53 0C 05 65 73 5f 55 53 0C 05 66 72 5f 43 41 0C 05 6e 6c 5f 4e 4c |
| End of Container | End of Available Locales | 0x18 | — | — |

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. An electronic device comprising:
at least one network interface;
a processor; and
a memory, wherein the memory comprises instructions configured to cause the processor to:
  receive, from a remote device and via a network interface of the at least one network interfaces, a request for active or available locales for the electronic device;
  send, to the remote device and via the network interface, a message in a locale profile format including a list of available locales, wherein the message comprises:
    a version field that indicates a version of schema used to transmit the list of available locales;
    an active local field that indicates a locale currently being used by the electronic device; and
    an available locales field that indicates which locales are available for use by the electronic device;
  enable the remote device to read the version field using a locale profile;
  disable the remote device from writing to the version field using the locale profile; and
  enable the remote device to write to the version field using a profile other than the locale profile.

2. The electronic device of claim 1, wherein the instructions are configured to cause the processor receive a request from the remote device to change the active locale for the electronic device from the active locale indicated in the message to an available locale listed in the available locales field transmitted in the message from the electronic device to the remote device in response to the request for active or available locales for the electronic device.

3. The electronic device of claim 1, wherein the version field includes a profile tag that indicates that the following information relates to the version of schema used to transmit the list of available locales, wherein the profile tag comprises a tag value of 0x0002 that indicates that a following data payload designates the version of the schema which the electronic device uses to transmit the list of available locales.

4. The electronic device of claim 3, wherein the version field includes the data payload that designates the version the version of the schema which the electronic device uses to transmit the list of available locales, wherein data in the data payload comprises an unsigned integer between 0 and 255, wherein each integer between 0 and 255 corresponds to the version of the schema of a plurality of schema versions used to encode locale information for the electronic device.

5. The electronic device of claim 4, wherein each version of the schema corresponding to an integer of the integers between 0 and 255 is additive relative to versions of the schema corresponding to lower integers, and the version integer is advisory to the remote device to inform the remote device that schema fields are present in the schema that are newer than those present in only the versions of the schema corresponding to the lower integers.

6. The electronic device of claim 5, wherein the instructions are configured to cause the processor to:
update the schema version to a new version of the schema without updating the version field; and
by encoding data in the new version of the schema, enabling the remote device determine the presence of schema fields are present in the schema that are newer than those present in only the versions of the schema corresponding to the lower integers.

7. The electronic device of claim 1, wherein enabling the remote device to write to the version field using a profile other than the locale profile comprises:
changing a value of the version field to a new value in response to a request to update software command as part of a software update profile used to update code stored in the memory of the electronic device; and
updating the schema to a version of the schema corresponding to new value.

8. Non-transitory, computer-readable medium having instructions stored thereon that, when executed, are configured to cause a processor to:
receive, from a remote device and via a network interface of at least one network interfaces of an electronic device, a request for active or available locales for the electronic device;
send, to the remote device and via the network interface, a message in a locale profile format including a list of available locales, wherein the message comprises:
a version field that indicates a version of schema used to transmit the list of available locales;
an active local field that indicates a locale currently being used by the electronic device; and
an available locales field that indicates which locales are available for use;
enable the remote device to read the version field using a locale profile;
disable the remote device from writing to the version field using the locale profile; and
enable the remote device to write to the version field using a profile other than the locale profile.

9. The non-transitory, computer-readable medium of claim 8, wherein each locale comprises a location for the electronic device and a language for the device, wherein the language is location-specific to identify features of the identified language that are specific to the location or a dialect identified by the location in combination with the language.

10. The non-transitory, computer-readable medium of claim 8, wherein the active locale field indicates a locale of a plurality of available locales that the electronic device currently employs in communication with the remote device, with users, or with a remote service, wherein the active locale field comprises an active locale field tag including a tag value of 0x0001 that indicates that the following information identifies an active locale for the electronic device.

11. The non-transitory, computer-readable medium of claim 10, wherein the available locale field comprises a list of one or more available locales that the electronic device is capable of understanding or using to communicate with the remote device, with users, or with a remote service, wherein the available locale field comprises an available locale field tag including a tag value of 0x0002 identifying the following information as available locales that the electronic device is capable of understanding or using to communicate with the remote device, with users, or with the remote service.

12. The non-transitory, computer-readable medium of claim 11, wherein the locale information transmitted with the active locale field and the available locale field comprises a Universal Character Set and Transformation Format-8 bit (UTF-8) string that indicates the location and language of the locale, and the UTF-8 string is formatted in an Internet Engineering Task Force Best Current Practice 47 (IETF BCP 47) format.

13. The non-transitory, computer-readable medium of claim 11, wherein the active locale field may be read or written by any device that may securely connect to the electronic device using network or fabric credentials, and the available locale field may be read by any device that may securely connect to the electronic device using the network or fabric credentials.

14. A method for conveying locale information for an electronic device, comprising:
receiving, from a remote device and via a network interface of at least one network interfaces of an electronic device, a request for active or available locales for the electronic device;
sending, to the remote device and via the network interface, a message in a locale profile format including a list of available locales, wherein the message comprises:
a version field that indicates a version of schema used to transmit the list of available locales;
an active local field that indicates a locale currently being used by the electronic device; and
an available locales field that indicates which locales are available for use;
enabling the remote device to read the version field using a locale profile;
disabling the remote device from writing to the version field using the locale profile; and
enabling the remote device to write to the version field using a profile other than the locale profile.

15. The method of claim 14, wherein receiving the request for active or available locales from the remote device via the network interface comprises receiving a data management view request from the remote device, wherein the data management view request may include a request to view the entire locale profile or a request to view only the available locales field of the locale profile.

16. The method of claim 14, comprising receiving a request from the remote device to change the active locale for the electronic device from the active locale indicated in the message to an available locale listed in the available locales field transmitted in the message from the electronic device to the remote device in response to the request for active or available locales for the electronic device.

17. The method of claim 16, comprising:
   determining whether the request to change the active locale is properly formatted request that pertains to an available locale;
   if the request to change the active locale is a properly formatted request that pertains to an available locale, changing the active locale field to a locale indicated in the request; and
   if the request to change the active locale is not properly formatted or pertains to a locale not stored in the available locales, responding with a notification to the remote device that the requested change has failed.

18. The method of claim 17, wherein the request to change the active locale includes a requested locale that is not supported by the electronic device or is unknown to the electronic device, and the notification to the remote device may include a status report using the core profile to update the remote device on the status of the requested update, wherein the status report has a status code of 0x0001 under the locale profile that indicates that the requested locale is not supported or in unknown to the electronic device.

19. The method of claim 17, wherein the request to change the active locale includes a requested locale that is in not in an expected format, and the notification to the remote device may include a status report using the core profile to update the remote device on the status of the requested update, wherein the status report has a status code of 0x0002 under the locale profile that indicates that the requested locale is not properly formatted.

20. An electronic device comprising:
   at least one network interface;
   a processor; and
   a memory, wherein the memory comprises instructions configured to cause the processor to:
      receive, from a remote device and via a network interface of the at least one network interfaces, a request for active or available locales for the electronic device;
      send, to the remote device and via the network interface, a message in a locale profile format including a list of available locales, wherein the message comprises:
         a version field that indicates a version of schema used to transmit the list of available locales;
         an active local field that indicates a locale currently being used by the electronic device; and
         an available locales field that indicates which locales are available for use by the electronic device, wherein the version field includes a profile tag that indicates that the following information relates to the version of schema used to transmit the list of available locales, wherein the profile tag comprises a tag value of 0x0002 that indicates that a following data payload designates the version of the schema which the electronic device uses to transmit the list of available locales, wherein each version of the schema corresponding to an integer of the integers between 0 and 255 is additive relative to versions of the schema corresponding to lower integers, and the version integer is advisory to the remote device to inform the remote device that schema fields are present in the schema that are newer than those present in only the versions of the schema corresponding to the lower integers, and wherein each version of the schema corresponding to an integer of the integers between 0 and 255 is additive relative to versions of the schema corresponding to lower integers, and the version integer is advisory to the remote device to inform the remote device that schema fields are present in the schema that are newer than those present in only the versions of the schema corresponding to the lower integers.

21. The electronic device of claim 20, wherein the instructions are configured to cause the processor to:
   update the schema version to a new version of the schema without updating the version field;
   by encoding data in the new version of the schema, enabling the remote device determine the presence of schema fields are present in the schema that are newer than those present in only the versions of the schema corresponding to the lower integers.

22. The electronic device of claim 20, wherein the instructions are configured to cause the processor to:
   enable the remote device to read the version field using a locale profile;
   disable the remote device from writing to the version field using the locale profile; and
   enable the remote device to write to the version field using a profile other than the locale profile.

23. A method for conveying locale information for an electronic device, comprising:
   receiving, from a remote device and via a network interface of at least one network interfaces of an electronic device, a request for active or available locales for the electronic device;
   sending, to the remote device and via the network interface, a message in a locale profile format including a list of available locales, wherein the message comprises:
      a version field that indicates a version of schema used to transmit the list of available locales;
      an active local field that indicates a locale currently being used by the electronic device; and
      an available locales field that indicates which locales are available for use, wherein the version field includes a profile tag that indicates that the following information relates to the version of schema used to transmit the list of available locales, wherein the profile tag comprises a tag value of 0x0002 that indicates that a following data payload designates the version of the schema which the electronic device uses to transmit the list of available locales, wherein each version of the schema corresponding to an integer of the integers between 0 and 255 is additive relative to versions of the schema corresponding to lower integers, and the version integer is advisory to the remote device to inform the remote device that schema fields are present in the schema that are newer than those present in only the versions of the schema corresponding to the lower integers, and wherein each version of the schema corresponding to an integer of the integers between 0 and 255 is additive relative to versions of the schema corresponding to lower integers, and the version integer is advisory to the remote device to inform the remote device that schema fields are present in the schema that are newer than those present in only the versions of the schema corresponding to the lower integers.

24. The method of claim 23 comprising:
   enabling the remote device to read the version field using a locale profile;

disabling the remote device from writing to the version field using the locale profile; and enabling the remote device to write to the version field using a profile other than the locale profile.

25. The method of claim 23, wherein receiving the request for active or available locales from the remote device via the network interface comprises receiving a data management view request from the remote device, wherein the data management view request may include a request to view the entire locale profile or a request to view only the available locales field of the locale profile.

26. The method of claim 23 comprising receiving a request from the remote device to change the active locale for the electronic device from the active locale indicated in the message to an available locale listed in the available locales field transmitted in the message from the electronic device to the remote device in response to the request for active or available locales for the electronic device.

27. An electronic device comprising:
at least one network interface;
a processor; and
a memory, wherein the memory comprises instructions configured to cause the processor to:
receive, from a remote device and via a network interface of the at least one network interfaces, a request for active or available locales for the electronic device;
send, to the remote device and via the network interface, a message in a locale profile format including a list of available locales, wherein the message comprises:
a version field that indicates a version of schema used to transmit the list of available locales;
an active local field that indicates a locale currently being used by the electronic device; and
an available locales field that indicates which locales are available for use by the electronic device;
enable the remote device to write to the version field using a profile field other than a locale profile, wherein enabling the remote device to write to the version field using a profile other than the locale profile comprises:
changing a value of the version field to a new value in response to a request to update software command as part of a software update profile used to update code stored in the memory of the electronic device; and
updating the schema to a version of the schema corresponding to new value.

28. The electronic device of claim 27, wherein the instructions are configured to cause the processor receive a request from the remote device to change the active locale for the electronic device from the active locale indicated in the message to an available locale listed in the available locales field transmitted in the message from the electronic device to the remote device in response to the request for active or available locales for the electronic device.

29. The electronic device of claim 27, wherein the version field includes a profile tag that indicates that the following information relates to the version of schema used to transmit the list of available locales, wherein the profile tag comprises a tag value of 0x0002 that indicates that a following data payload designates the version of the schema which the electronic device uses to transmit the list of available locales.

30. The electronic device of claim 27, wherein each locale comprises a location for the electronic device and a language for the device, wherein the language is location-specific to identify features of the identified language that are specific to the location or a dialect identified by the location in combination with the language.

31. A method for conveying locale information for an electronic device, comprising:
receiving, from a remote device and via a network interface of at least one network interfaces of an electronic device, a request for active or available locales for the electronic device;
sending, to the remote device and via the network interface, a message in a locale profile format including a list of available locales, wherein the message comprises:
a version field that indicates a version of schema used to transmit the list of available locales;
an active local field that indicates a locale currently being used by the electronic device; and
an available locales field that indicates which locales are available for use; and
enabling the remote device to write to the version field using a profile field other than a locale profile, wherein enabling the remote device to write to the version field using a profile other than the locale profile comprises:
changing a value of the version field to a new value in response to a request to update software command as part of a software update profile used to update code stored in the memory of the electronic device; and
updating the schema to a version of the schema corresponding to new value.

32. The method of claim 31, wherein each locale comprises a location for the electronic device and a language for the device, wherein the language is location-specific to identify features of the identified language that are specific to the location or a dialect identified by the location in combination with the language.

33. The method of claim 31, wherein the active locale field indicates a locale of a plurality of available locales that the electronic device currently employs in communication with the remote device, with users, or with a remote service, wherein the active locale field comprises an active locale field tag including a tag value of 0x0001 that indicates that the following information identifies an active locale for the electronic device.

34. A method for conveying locale information for an electronic device, comprising:
receiving, from a remote device and via a network interface of at least one network interfaces of an electronic device, a request for active or available locales for the electronic device;
sending, to the remote device and via the network interface, a message in a locale profile format including a list of available locales, wherein the message comprises:
a version field that indicates a version of schema used to transmit the list of available locales;
an active local field that indicates a locale currently being used by the electronic device, wherein the active locale field indicates a locale of a plurality of available locales that the electronic device currently employs in communication with the remote device, with users, or with a remote service, wherein the active locale field comprises an active locale field tag including a tag value of 0x0001 that indicates that the following information identifies an active locale for the electronic device; and
an available locales field that indicates which locales are available for use,
wherein the available locale field comprises a list of one or more available locales that the electronic device is capable of understanding or using to communicate with the remote device, with users, or with a remote service, wherein the available locale field comprises an available locale field tag including a tag value of 0x0002 identifying the following information as available locales that the electronic device is capable of understanding or using to communicate with the remote device, with users, or with the remote service, wherein the locale information transmitted with the active locale field and the available locale field comprises a Universal Character Set and Transformation Format-8 bit (UTF-8) string that indicates the location and language of the locale, and the UTF-8 string is formatted in an Internet Engineering Task Force Best Current Practice 47 (IETF BCP 47) format.

35. The method of claim 34, wherein receiving the request for active or available locales from the remote device via the network interface comprises receiving a data management view request from the remote device, wherein the data management view request may include a request to view the entire locale profile or a request to view only the available locales field of the locale profile.

36. The method of claim 34, comprising receiving a request from the remote device to change the active locale for the electronic device from the active locale indicated in the message to an available locale listed in the available locales field transmitted in the message from the electronic device to the remote device in response to the request for active or available locales for the electronic device.

37. The method of claim 36, comprising:
determining whether the request to change the active locale is properly formatted request that pertains to an available locale;
if the request to change the active locale is a properly formatted request that pertains to an available locale, changing the active locale field to a locale indicated in the request; and
if the request to change the active locale is not properly formatted or pertains to a locale not stored in the available locales, responding with a notification to the remote device that the requested change has failed.

38. An electronic device comprising:
at least one network interface;
a processor; and
a memory, wherein the memory comprises instructions configured to cause the processor to:
receive, from a remote device and via a network interface of the at least one network interfaces, a request for active or available locales for the electronic device;
send, to the remote device and via the network interface, a message in a locale profile format including a list of available locales, wherein the message comprises:
a version field that indicates a version of schema used to transmit the list of available locales;
an active local field that indicates a locale currently being used by the electronic device, wherein the active locale field indicates a locale of a plurality of available locales that the electronic device currently employs in communication with the remote device, with users, or with a remote service, wherein the active locale field comprises an active locale field tag including a tag value of 0x0001 that indicates that the following information identifies an active locale for the electronic device; and
an available locales field that indicates which locales are available for use by the electronic device, wherein the available locale field comprises a list of one or more available locales that the electronic device is capable of understanding or using to communicate with the remote device, with users, or with a remote service, wherein the available locale field comprises an available locale field tag including a tag value of 0x0002 identifying the following information as available locales that the electronic device is capable of understanding or using to communicate with the remote device, with users, or with the remote service, wherein the locale information transmitted with the active locale field and the available locale field comprises a Universal Character Set and Transformation Format-8 bit (UTF-8) string that indicates the location and language of the locale, and the UTF-8 string is formatted in an Internet Engineering Task Force Best Current Practice 47 (IETF BCP 47) format.

39. The electronic device of claim 38, wherein the version field includes a profile tag that indicates that the following information relates to the version of schema used to transmit the list of available locales, wherein the profile tag comprises a tag value of 0x0002 that indicates that a following data payload designates the version of the schema which the electronic device uses to transmit the list of available locales.

40. The electronic device of claim 38, wherein the instructions are configured to cause the processor receive a request from the remote device to change the active locale for the electronic device from the active locale indicated in the message to an available locale listed in the available locales field transmitted in the message from the electronic device to the remote device in response to the request for active or available locales for the electronic device.

41. An electronic device comprising:
at least one network interface;
a processor; and
a memory, wherein the memory comprises instructions configured to cause the processor to:
receive, from a remote device and via a network interface of the at least one network interfaces, a request for active or available locales for the electronic device;
send, to the remote device and via the network interface, a message in a locale profile format including a list of available locales, wherein the message comprises:
a version field that indicates a version of schema used to transmit the list of available locales;
an active local field that indicates a locale currently being used by the electronic device, wherein the active locale field indicates a locale of a plurality of available locales that the electronic device currently employs in communication with the remote device, with users, or with a remote service, wherein the active locale field comprises an active locale field tag including a tag value of 0x0001 that indicates that the following information identifies an active locale for the electronic device; and
an available locales field that indicates which locales are available for use by the electronic device, wherein the available locale field comprises a list of one or more available locales that the electronic device is capable of understanding or using to communicate with the remote device, with users, or with a remote service, wherein the available locale field comprises an available locale field tag including a tag value of 0x0002 identifying the following information as available locales that the electronic device is capable of understanding or using to communicate with the remote device, with users, or with the remote service, wherein the active locale field may be read or written by any device that may securely connect to the electronic device using network or fabric credentials, and the available locale field may be read by any device that may securely connect to the electronic device using the network or fabric credentials.

42. The electronic device of claim 41, wherein the version field includes a data payload that designates the version the version of the schema which the electronic device uses to transmit the list of available locales, wherein data in the data payload comprises an unsigned integer between 0 and 255, wherein each integer between 0 and 255 corresponds to the version of the schema of a plurality of schema versions used to encode locale information for the electronic device.

43. The electronic device of claim 5, wherein the instructions are configured to cause the processor to:
update the schema version to a new version of the schema without updating the version field; and
by encoding data in the new version of the schema, enabling the remote device determine the presence of schema fields are present in the schema that are newer than those present in only the versions of the schema corresponding to the lower integers.

44. A method for conveying locale information for an electronic device, comprising:
receiving, from a remote device and via a network interface of at least one network interfaces of an electronic device, a request for active or available locales for the electronic device;
sending, to the remote device and via the network interface, a message in a locale profile format including a list of available locales, wherein the message comprises:
a version field that indicates a version of schema used to transmit the list of available locales;
an active local field that indicates a locale currently being used by the electronic device, wherein the active locale field indicates a locale of a plurality of available locales that the electronic device currently employs in communication with the remote device, with users, or with a remote service, wherein the active locale field comprises an active locale field tag including a tag value of 0x0001 that indicates that the following information identifies an active locale for the electronic device; and
an available locales field that indicates which locales are available for use, wherein the available locale field comprises a list of one or more available locales that the electronic device is capable of understanding or using to communicate with the remote device, with users, or with a remote service, wherein the available locale field comprises an available locale field tag including a tag value of 0x0002 identifying the following information as available locales that the electronic device is capable of understanding or using to communicate with the remote device, with users, or with the remote service, wherein the active locale field may be read or written by any device that may securely connect to the electronic device using network or fabric credentials, and the available locale field may be read by any device that may securely connect to the electronic device using the network or fabric credentials.

45. The method of claim 44, wherein receiving the request for active or available locales from the remote device via the network interface comprises receiving a data management view request from the remote device, wherein the data management view request may include a request to view the entire locale profile or a request to view only the available locales field of the locale profile.

46. The method of claim 44, wherein each locale comprises a location for the electronic device and a language for the device, wherein the language is location-specific to identify features of the identified language that are specific to the location or a dialect identified by the location in combination with the language.

47. An electronic device comprising:
at least one network interface;
a processor; and
a memory, wherein the memory comprises instructions configured to cause the processor to:
receive, from a remote device and via a network interface of the at least one network interfaces, a request for active or available locales for the electronic device;
send, to the remote device and via the network interface, a message in a locale profile format including a list of available locales, wherein the message comprises:
a version field that indicates a version of schema used to transmit the list of available locales;
an active local field that indicates a locale currently being used by the electronic device; and
an available locales field that indicates which locales are available for use by the electronic device;
receive a request from the remote device to change the active locale for the electronic device from the active locale indicated in the message to an available locale listed in the available locales field transmitted in the message from the electronic device to the remote device in response to the request for active or available locales for the electronic device;
determine whether the request to change the active locale is properly formatted request that pertains to an available locale;
if the request to change the active locale is a properly formatted request that pertains to an available locale, change the active locale field to a locale indicated in the request; and
if the request to change the active locale is not properly formatted or pertains to a locale not stored in the available locales, respond with a notification to the remote device that the requested change has failed.

48. The electronic device of claim 47, wherein the instructions are configured to cause the processor receive a request from the remote device to change the active locale for the electronic device from the active locale indicated in the message to an available locale listed in the available locales field transmitted in the message from the electronic device to the remote device in response to the request for active or available locales for the electronic device.

49. The electronic device of claim 47, wherein the version field includes a profile tag that indicates that the following information relates to the version of schema used to transmit the list of available locales, wherein the profile tag comprises a tag value of 0x0002 that indicates that a following data payload designates the version of the schema which the electronic device uses to transmit the list of available locales.

50. A method for conveying locale information for an electronic device, comprising:
receiving, from a remote device and via a network interface of at least one network interfaces of an electronic device, a request for active or available locales for the electronic device;

sending, to the remote device and via the network interface, a message in a locale profile format including a list of available locales, wherein the message comprises:

a version field that indicates a version of schema used to transmit the list of available locales;

an active local field that indicates a locale currently being used by the electronic device; and an available locales field that indicates which locales are available for use;

receiving a request from the remote device to change the active locale for the electronic device from the active locale indicated in the message to an available locale listed in the available locales field transmitted in the message from the electronic device to the remote device in response to the request for active or available locales for the electronic device;

determining whether the request to change the active locale is properly formatted request that pertains to an available locale;

if the request to change the active locale is a properly formatted request that pertains to an available locale, changing the active locale field to a locale indicated in the request; and if the request to change the active locale is not properly formatted or pertains to a locale not stored in the available locales, responding with a notification to the remote device that the requested change has failed.

51. The method of claim 50, wherein each locale comprises a location for the electronic device and a language for the device, wherein the language is location-specific to identify features of the identified language that are specific to the location or a dialect identified by the location in combination with the language.

52. The method of claim 50, comprising receiving a request from the remote device to change the active locale for the electronic device from the active locale indicated in the message to an available locale listed in the available locales field transmitted in the message from the electronic device to the remote device in response to the request for active or available locales for the electronic device.

* * * * *